United States Patent
Mariano et al.

(10) Patent No.: US 11,846,034 B1
(45) Date of Patent: Dec. 19, 2023

(54) CARBON MONOXIDE ELECTROLYZERS USED WITH REVERSE WATER GAS SHIFT REACTORS FOR THE CONVERSION OF CARBON DIOXIDE INTO ADDED-VALUE PRODUCTS

(71) Applicant: Dioxycle, Bordeaux (FR)

(72) Inventors: Ruperto G Mariano, Ithaca, NY (US); Jonathan Maistrello, La Garenne Colombes (FR); Sarah Lamaison, Paris (FR); David Wakerley, Paris (FR)

(73) Assignee: Dioxycle, Bordeaux (FR)

( * ) Notice: Subject to any disclaimer, the term of this patent is extended or adjusted under 35 U.S.C. 154(b) by 0 days.

(21) Appl. No.: 18/111,631

(22) Filed: Feb. 20, 2023

Related U.S. Application Data

(60) Provisional application No. 63/427,800, filed on Nov. 23, 2022.

(51) Int. Cl.
  *C25B 3/25* (2021.01)
  *C25B 3/23* (2021.01)
  (Continued)

(52) U.S. Cl.
  CPC ............ *C25B 3/23* (2021.01); *B01J 12/007* (2013.01); *B01J 19/088* (2013.01); *C01B 32/40* (2017.08);
  (Continued)

(58) Field of Classification Search
  CPC .............................. C25B 3/25; C25B 15/081
  (Continued)

(56) References Cited

U.S. PATENT DOCUMENTS

| | | |
|---|---|---|
| 3,963,483 A | 6/1976 | Mathesius et al. |
| 11,390,954 B2 | 7/2022 | Spurgeon |

(Continued)

FOREIGN PATENT DOCUMENTS

| | | |
|---|---|---|
| CN | 1049177 A | 2/1991 |
| EP | 1861478 A1 | 12/2007 |

(Continued)

OTHER PUBLICATIONS

Cascade CO2 electroreduction enables efficient carbonate-free production of ethylene, Ozden et al., Joule 5, 706-719, Mar. 17, 2021 ª 2021 Elsevier Inc., https://doi.org/10.1016/j.joule.2021.01.007.

(Continued)

*Primary Examiner* — Edna Wong
(74) *Attorney, Agent, or Firm* — Daylight Law, P.C.

(57) ABSTRACT

Methods and systems related to valorizing carbon dioxide are disclosed. A disclosed system includes a reverse water gas shift (RWGS) reactor, a carbon dioxide source connection fluidly connecting a carbon dioxide source to the RWGS reactor, an electrolyzer having an anode area and a cathode area, and a carbon monoxide source connection fluidly connecting the RWGS reactor to the cathode area. The RWGS reactor is configured to generate, using a volume of carbon dioxide from the carbon dioxide source connection, a volume of carbon monoxide in a RWGS reaction. The electrolyzer is configured to generate, using the electrolyzer and a reduction of the volume of carbon monoxide from the carbon monoxide source connection and an oxidation of an oxidation substrate, a volume of generated chemicals including hydrocarbons, organic acids, alcohol, olefins, or N-rich organic compounds.

12 Claims, 16 Drawing Sheets

(51) Int. Cl.
C01B 32/40 (2017.01)
B01J 12/00 (2006.01)
B01J 19/08 (2006.01)
C07B 33/00 (2006.01)
C25B 3/07 (2021.01)
C25B 3/09 (2021.01)
C25B 15/08 (2006.01)
C25B 9/23 (2021.01)
C25B 3/03 (2021.01)

(52) U.S. Cl.
CPC ............... C07B 33/00 (2013.01); C25B 3/03 (2021.01); C25B 3/07 (2021.01); C25B 3/09 (2021.01); C25B 9/23 (2021.01); C25B 15/08 (2013.01); *B01J 2219/0875* (2013.01); *B01J 2219/0896* (2013.01); *C01B 2210/0003* (2013.01); *C01B 2210/0051* (2013.01)

(58) Field of Classification Search
USPC .................................. 205/431, 440, 450, 462
See application file for complete search history.

(56) References Cited

U.S. PATENT DOCUMENTS

| | | | | |
|---|---|---|---|---|
| 11,591,226 B1* | 2/2023 | Sunkara | ..................... | C01B 3/04 |
| 2013/0118910 A1* | 5/2013 | Teamey | ................... | C07C 29/58 |
| | | | | 205/462 |
| 2015/0136613 A1* | 5/2015 | Li | ............................ | C25B 3/25 |
| | | | | 205/555 |
| 2021/0123110 A1 | 4/2021 | Krüger | | |
| 2021/0381116 A1 | 12/2021 | Kashi et al. | | |
| 2022/0235426 A1 | 7/2022 | Duarte | | |
| 2022/0372643 A1 | 11/2022 | Wang et al. | | |
| 2023/0111972 A1* | 4/2023 | Echigo | ...................... | C25B 1/04 |
| | | | | 518/721 |

FOREIGN PATENT DOCUMENTS

| | | | | |
|---|---|---|---|---|
| JP | 2000233905 A | 8/2000 | | |
| WO | 2020114899 A1 | 6/2020 | | |
| WO | WO-2020237563 A1 * | 12/2020 | ............. | B01D 53/00 |
| WO | 2021197787 A1 | 10/2021 | | |
| WO | 2022031726 A3 | 4/2022 | | |
| WO | 2022148837 A3 | 9/2022 | | |

OTHER PUBLICATIONS

Electroreduction of CO2/CO to C2 Products: Process Modeling, Downstream Separation, System Integration, and Economic Analysis, Mahinder Ramdin, Bert De Mot, Andrew R. T. Morrison, Tom Breugelmans, Leo J. P. van den Broeke, J. P. Martin Trusler, Ruud Kortlever, Wiebren de Jong, Othonas A. Moultos, Penny Xiao, Paul A. Webley, and Thijs J. H. Vlugt, Ind. Eng. Chem. Res. 2021, 60, 17862-17880.
Ethylene Electrosynthesis: A Comparative Techno-economic Analysis of Alkaline vs Membrane Electrode Assembly vs CO2—CO—C2H4 Tandems, ACS Energy Lett. 2021, 6, 997-1002.
A. Alcasabas et al. (2021). "A Comparison of Different Approaches to the Conversion of Carbon Dioxide into Useful Products: Part I : CO2 reduction by electrocatalytic, thermocatalytic and biological routes." Johnson Matthey Technology Review 65: 180-196.
A. Prajapati et al.. (2022). CO2-free high-purity ethylene from electroreduction of CO2 with 4% solar-to-ethylene and 10% solar-to-carbon efficiencies. Cell Reports Physical Science.
L. Berkelaar et al. (2022). Electrochemical conversion of carbon dioxide to ethylene: Plant design, evaluation and prospects for the future. Chemical engineering research and design (Transactions of the Institution of Chemical Engineers, part A), 182, 194-206. https://doi.org/10.1016/j.cherd.2022.03.034.
M. Jouny et al. (2018). High-rate electroreduction of carbon monoxide to multi-carbon products. Nat Catal 1, 748-755. https://doi.org/10.1038/s41929-018-0133-2.
M. Jouny et al. (2019). Carbon monoxide electroreduction as an emerging platform for carbon utilization. Nature Catalysis, 2 (12). Retrieved from https://par.nsf.gov/biblio/10191695. https://doi.org/10.1038/s41929-019-0388-2.
M. Reinikainen et al. (2022). "Two-Step Conversion of CO2 to Light Olefins: Laboratory-Scale Demonstration and Scale-Up Considerations" ChemEngineering 6, No. 6: 96. https://doi.org/10.3390/chemengineering6060096.
O. Y. H. Elsernagawy et al. (2020). Thermo-economic analysis of reverse water-gas shift process with different temperatures for green methanol production as a hydrogen carrier. Journal of CO2 Utilization, 41, [101280]. https://doi.org/10.1016/j.jcou.2020.101280.
Waseda University. (Jan. 13, 2021). Copper-indium oxide: A faster and cooler way to reduce our carbon footprint: Scientists set a record for the highest conversion rate of carbon dioxide at low temperatures with copper-modified Indium oxide, signifying sustainable e-fuel. ScienceDaily. Retrieved May 31, 2023 from www.sciencedaily.com/releases/2021/01/210113100827.htm.
Y.A. Daza et al.. (2016). CO2 conversion by reverse water gas shift catalysis: comparison of catalysts, mechanisms and their consequences for CO2 conversion to liquid fuels. RSC Advances, 6, 49675-49691.
F. Yang et al., (2021). Harmonized comparison of virgin steel production using biomass with carbon capture and storage for negative emissions. International Journal of Greenhouse Gas Control.
FA Uribe et al., (1983). Electrochemistry in liquid ammonia: Part VI. Reduction of carbon monoxide. Journal of Electroanalytical Chemistry and Interfacial Electrochemistry, 152(1-2), 173-182.
M. Kirschen et al., (2011). Influence of direct reduced iron on the energy balance of the electric arc furnace in steel industry. Fuel and Energy Abstracts.
Non-Final Office Action dated Jul. 27, 2023 from U.S. Appl. No. 18/138,116, 18 pages.
A. Mokhtari et al. (2022). Integrating Electric Arc Furnace and Biomass Gasification to Reduce Greenhouse Gas Emissions from Steel Making. SSRN Electronic Journal.
Final Office Action dated Oct. 26, 2023 from U.S. Appl. No. 18/138,116, 14 pages.
J. G. Bekker et al. (2000). Model predictive control of an electric arc furnace off-gas process. Control Engineering Practice, 8, 445-455.

* cited by examiner

CARBON MONOXIDE ELECTROLYZERS USED WITH REVERSE WATER GAS SHIFT REACTORS FOR THE CONVERSION OF CARBON DIOXIDE INTO ADDED-VALUE PRODUCTS

CROSS REFERENCE TO RELATED APPLICATIONS

This application claims the benefit of U.S. Provisional Patent Application No. 63/427,800 filed Nov. 23, 2022, which is incorporated by reference herein in its entirety for all purposes.

BACKGROUND

There is an urgent need to reduce the emissions related to the production of useful fuels and chemicals in our society. Furthermore, there is an urgent need to develop technologies which make the capture or direct valorization of carbon dioxide more economical. Accordingly, technologies that both generate useful fuels and chemicals, while at the same time using carbon dioxide feedstock that would otherwise have been emitted into the atmosphere, are critically important because they both generate useful chemicals without additional emissions and because the economic value of the useful chemicals can offset the cost of carbon dioxide capture and conversion.

SUMMARY

The low-carbon production of small valuable molecules such as hydrocarbons, olefins, alcohols, and carboxylic acids from carbon dioxide is particularly challenging because carbon dioxide is an inert molecule that requires an energy input to be reduced to energy-rich small molecules. Carbon dioxide electrolysis is a recent technological pathway to electrolyze carbon dioxide and water to carbon monoxide and other small molecules using low-carbon electricity. However, this process suffers from multiple drawbacks, a great number of which are associated with the so-called "carbonate problem" involving the reaction of carbon dioxide with alkaline equivalents in the electrolyzer.

The carbonate problem leads to excess energy consumption in a carbon dioxide electrolyzer. The energy required to power the electrochemical processes occurring at the cathode and anode of a carbon dioxide electrolyzer is minimized when a carbon dioxide electrolyzer is operated in highly alkaline electrolyte. Operating at high pH also enables the use of efficient, abundant metallic catalysts for water oxidation reaction at the electrolyzer anode. However, at steady state, carbon dioxide reacts with alkaline equivalents in the electrolyzer (see eq. 1-4 below), consuming alkaline equivalents in the electrolyzer and lowering the operating pH of the electrolyzer because bicarbonate and carbonate species are formed. This leads to large increases in the energy required to power the carbon dioxide electrolysis process, and the formation of these anionic species and their salts leads to declines in electrolyzer performance and lifetime.

$$CO_2 + OH^- \rightleftharpoons HCO_3^- \quad (1)$$

$$CO_2 + H_2O \rightleftharpoons H_2CO_3 \quad (2)$$

$$HCO_3^- + OH^- \rightleftharpoons CO_3^{2-} + H_2O \quad (3)$$

$$HCO_3^- + H_2O \rightleftharpoons H_3O^+ + CO_3^{2-} \quad (4)$$

A lower electrolyzer pH leads to higher energy requirements at the anode of a carbon dioxide electrolyzer because non-precious anode materials such as but not limited to those composed of Ni, Co, Mn, Ti and Fe with high activity, selectivity, and stability require higher driving forces to achieve the same current at low pH versus high pH. The cathode overpotential is also lower at high electrolyzer pH because dihydrogen evolution is more facile at lower pH. A lower electrolyte pH can also serve to increase the proportion of current that produces dihydrogen at the cathode instead of reducing carbon dioxide to more valuable products and alter the product distribution of the carbon dioxide reduction products.

The reactions associated with the carbonate problem can also lead to corrosion and degradation of the components of a carbon dioxide electrolyzer. For example, the lower electrolyzer pH mentioned above can serve to negatively impact the performance of electrolyzer membranes by reducing rates of transport of lifetimes. As another example, the reaction of carbon dioxide to produce carbonate and bicarbonate species can also lead to the formation of salt precipitates or regions of high salt concentration that foul electrolyzer components and lead to substantially degraded performance. For the cathode section, these precipitates are generally hygroscopic and impede efficient gas and liquid transport across the cathode. This is exacerbated by the fact that the mass diffusivity of carbon dioxide in water is approximately four orders of magnitude lower than its mass diffusivity in the gas phase. As another example, salts formed from the reaction of alkaline media with carbon dioxide gases can also precipitate within the membrane pores and impede efficient ion transport. At the anode, the incorporation of anionic species besides hydroxide can reduce the efficiency of the desired anodic reaction because of site poisoning and increased rates of anodic corrosion.

As outlined above, the carbonate problem results in: 1) greatly reduced electrolysis efficiency; 2) reduced carbon efficiency as part of the carbon dioxide is converted to bicarbonate and carbonate that are then transferred to another compartment of the system and would require additional separation cost for the carbon dioxide to be recovered; and 3) reduced system lifetime as the carbonate problem leads the system to degrade at steady-state. As a result, carbon dioxide electrolysis is associated with high costs that hampers its development at industrial scale in its current state.

While technologies for the efficient production of small valuable molecules such as hydrocarbons, olefins, alcohols, and carboxylic acids from carbon dioxide remain elusive, carbon dioxide is often used for the production of syngas (a mixture of dihydrogen and carbon monoxide) which is considered beneficial as it is a lower emission fuel source as compared to alternative hydrocarbons. For example, the reverse water gas shift (RWGS) reaction is used to produce mixtures of carbon monoxide and dihydrogen from carbon dioxide and dihydrogen according to equation (5) presented below. The RWGS reactor may form other hydrocarbons such as methane. The chemicals produced by the reactor can be described as chemicals that evolved from the inputs to the reactor. The performance of the RWGS reactor can be measured in terms of its selectivity to certain chemicals. For example, the RWGS reactor can have a selectivity defined as a ratio between an amount of carbon monoxide evolved over a sum of an amount of carbon monoxide evolved and an amount of methane evolved. Using some of the approaches disclosed herein that selectivity can be over 90%. The water produced during the process is separated from the mixture to produce the syngas. This reaction is endothermic and thus thermodynamically enhanced at high temperature. The reaction is the opposite of the water gas shift reaction which is used in the production of dihydrogen. RWGS reactors are fed with a mix of carbon dioxide and dihydrogen at high temperature (100° C.-1000° C.) and mid pressure (1-30 bar). The dihydrogen to carbon dioxide ratio of the feedstock for the reactor is usually on the order of between 0.9 and 2 according to the desired outlet syngas quality.

$$CO_2 + H_2 \leftrightarrow CO + H_2O \ \Delta H_r = +41.3 \ \frac{kJ}{mol} \quad (5)$$

The syngas produced from RWGS reactors can be used directly as a fuel source or used to supply a variety of processes, such as but not limited to the Fischer-Tropsch process, or the Sabatier process to produce liquid hydrocarbons and methane, respectively. However, unsaturated molecules such as olefins, organic acids, and alcohols remain difficult to access with these syngas upgrading systems. Other technologies exist for the conversion of carbon dioxide into syngas such as solid oxide electrolysis cells (SOECs) but suffer from other drawbacks related to their operation at high temperatures such as the coking of the electrodes (deposit of solid carbon that hinders catalysis) and mechanical issues related to operating at high temperature.

A problem solved by specific embodiments of the inventions disclosed herein is the cost competitive production of sustainable chemicals from carbon dioxide such as small olefins, organic acids and alcohols without being impacted by the carbonate problem described above.

A problem solved by specific embodiments of the inventions disclosed herein is the lack of a sustainable source of carbon monoxide to supply a carbon monoxide electrolyzer. Beyond RWGS, technologies exist for the conversion of carbon dioxide to carbon monoxide but typically suffer from poor performance at steady state, require high energy inputs for efficient performance, or require the conversion of fossil carbon feedstocks.

A problem solved by specific embodiments of the inventions disclosed herein is the lack of incentive and high cost of reducing the carbon dioxide emissions intensity of processes that produce valuable feedstock chemicals and/or materials. This problem includes the lack of a technological solution for producers who operate high greenhouse gas emissions processes to comply with regulatory requirements while remaining financially sustainable. In principle, the direct carbon dioxide emissions intensity of high greenhouse gas intensity industrial processes such as but not limited to chemical manufacturing, cement manufacturing, and iron and steel production, can be reduced by capturing and sequestering carbon dioxide. However, carbon dioxide capture and sequestration fundamentally represent and incur an economic and energetic cost. Technologies that can couple to carbon dioxide capture and sequestration while lowering total cost and provide economic incentives are necessary for reducing the greenhouse gas emissions of many industrial processes. The carbon dioxide used with the systems disclosed herein can be a volume of carbon dioxide is harvested from an industrial process; and the industrial process can be one of a steel or metal manufacturing process, cement manufacturing process, dihydrogen generation process, partial oxidation process, biomass processing plant, biomass gasification plant, bioethanol production process, biogas production process, biowaste incineration process, hydroformylation process, power generation process, and waste incineration process. The carbon dioxide can also be harvested from direct air capture.

Methods and systems related to the valorization of carbon dioxide using RWGS reactors, output stream purification, and novel carbon monoxide electrolyzers are disclosed herein. Specific embodiments of the inventions disclosed herein utilize a novel system integration that combines the use of RWGS reactors for the specific production of carbon monoxide with novel electrolyzers that are designed for the low-temperature electrolysis of carbon monoxide. The combined process does not suffer from the carbonate problem associated with direct carbon dioxide electrolysis. The combined process allows for the production of sustainable useful chemicals benefiting from the advantageous selectivity and fitness of carbon oxide electrolysis while suppressing the carbonate problem that has heretofore hampered development of alternative solutions at scale.

In specific embodiments of the inventions disclosed herein, a RWGS reactor takes in a volume of carbon dioxide as a feedstock and produces a volume of carbon monoxide. The volume of carbon monoxide can then be provided to the cathode of a carbon monoxide electrolyzer where it can be used as the reduction substrate for a reduction reaction paired with an oxidation reaction in the anode of the carbon monoxide electrolyzer. One or more additive chemicals can be provided with the carbon monoxide to the electrolyzer. The reduction of the carbon monoxide can produce useful chemicals such that the tandem reactor comprising the RWGS reactor and the carbon monoxide electrolyzer serves to valorize the carbon dioxide. The characteristics of the produced chemicals depend on the characteristics of the electrolyzer and the additive chemicals.

In specific embodiments of the inventions disclosed herein, a RWGS reactor is used, contrarily to its traditional use for the production of unseparated syngas streams composed of carbon monoxide, dihydrogen, carbon dioxide, and water, alongside a gas separation system to produce pure carbon monoxide streams. The purified, low-carbon-dioxide, high-carbon-monoxide content gas stream produced by the RWGS reactor and gas separator is then dedicated to supplying a carbon monoxide electrolyzer as described above.

In a specific embodiment of the inventions disclosed herein, the RWGS reactor is a RWGS plasma-based reactor and the RWGS reaction involves the generation of plasma. A key advantage of integrating a plasma-based RWGS reactor with a carbon monoxide electrolyzer is that both process segments of the production line could be operated at low temperatures, allowing for flexible operation and resistance to intermittency.

In specific embodiments of the inventions disclosed herein the RWGS reactor is calibrated to maximize carbon monoxide production relative to other potential outputs of a traditional RWGS reactor. In these embodiments, the reaction conditions of the RWGS process chain are optimized to minimize the amount of dihydrogen generated and maximize the amount of carbon monoxide produced. This embodiment reduces separation costs downstream of the RWGS reactor by maximizing the conversion of inlet dihydrogen into the system to produce carbon monoxide.

In specific embodiments of the inventions disclosed herein a separator, such as an acid scrubber, is located in the production line between the RWGS reactor and the carbon monoxide electrolyzer to remove any remaining carbon dioxide from the product of the RWGS reactor (e.g., syngas) before it reaches the electrolyzer.

In specific embodiments of the inventions disclosed herein dihydrogen recirculation systems are utilized which optimize for feedstock utilization and minimize costs. For example, in specific embodiments of the inventions disclosed herein recirculation schemes recirculate parasitic dihydrogen from the carbon monoxide electrolyzer as a feedstock for the RWGS reactor. In specific embodiments of the inventions disclosed herein, dihydrogen is fed back from one or more points on the tandem reactor to serve as a feedstock for the RWGS reactor. For example, unconverted dihydrogen can be separated from the carbon monoxide between the RWGS reactor and the electrolyzer and provided back to be an input to the RWGS reactor. As another example that can be used in the alternative or in combination, the cathode of the electrolyzer can conduct a parasitic reduction reaction (in addition to the targeted carbon monoxide reduction reaction) which produces dihydrogen, and this dihydrogen can be provided back to be an input to the RWGS reactor. These approaches decrease the cost of operating the RWGS reactor as the costly dihydrogen feedstock is used more efficiently.

In specific embodiments of the inventions disclosed herein, dihydrogen is produced at the output of the RWGS reactor and a part or all such dihydrogen is separated from the RWGS gas stream and valorized separately. These approaches are advantageous in embodiments where the input and output mass flux of the RWGS process chain and carbon monoxide electrolyzer are not commensurate, allowing for continuous operation and minimizing process bottlenecks. In specific embodiments, both recirculation of dihydrogen and separate valorization of the dihydrogen from the RWGS gas stream can be conducted in a single system. In these embodiments, the proportion of dihydrogen recirculated relative to the dihydrogen externally valorized can be adjusted to match with the carbon monoxide electrolyzer capacity. Furthermore, in such embodiments, a single production line can produce both dihydrogen and useful chemicals (e.g., ethylene) from an electricity source and a carbon dioxide source with a net ratio controlled by the recirculation rate of the dihydrogen downstream of the RWGS reactor (e.g., after a carbon monoxide and dihydrogen separation unit connected downstream of the RWGS reactor and before the carbon monoxide electrolyzer).

As used herein, the term "volume of" a substance (e.g., volume of carbon monoxide) is not meant to indicate a separate, distinct, and purified physical volume but is meant to refer to a collection of matter in the same sense that a cup of coffee with a tablespoon of milk added includes "a volume" of milk where that volume is a tablespoon. As used herein, the term "fluid" will be used to refer to describe a substance that is in any physical form including in liquid, gaseous, supercritical or a combination of liquid and gaseous form.

As used herein, valorization of carbon dioxide refers to the transformation of the carbon and oxygen components of carbon dioxide into more economically valuable chemicals such as hydrocarbons, organic acids, alcohols, olefins and N-rich organic compounds.

In specific embodiments of the inventions disclosed herein, a method is provided. The method comprises harvesting a volume of carbon dioxide, supplying the volume of carbon dioxide to a reverse water gas shift reactor, generating, using the volume of carbon dioxide and the reverse water gas shift reactor, a volume of carbon monoxide in a reverse water gas shift reaction, supplying the volume of carbon monoxide to a cathode area of an electrolyzer, and generating, using the electrolyzer and a reduction of the volume of carbon monoxide and an oxidation of an oxidation substrate, a volume of generated chemicals. The volume of generated chemicals is at least one of: a volume of hydrocarbons, a volume of organic acids, a volume of alcohol, a volume of olefins, and a volume of N-rich organic compounds.

In specific embodiments of the inventions disclosed herein, a system is provided. The system comprises a reverse water gas shift reactor, a carbon dioxide source connection fluidly connecting a carbon dioxide source to the reverse water gas shift reactor, an electrolyzer having an anode area and a cathode area, and a carbon monoxide source connection fluidly connecting the reverse water gas shift reactor to the cathode area. The reverse water gas shift reactor is configured to generate, using a volume of carbon dioxide from the carbon dioxide source connection, a volume of carbon monoxide in a reverse water gas shift reaction. The electrolyzer is configured to generate, using a reduction of the volume of carbon monoxide from the carbon monoxide source connection and an oxidation of an oxidation substrate, a volume of generated chemicals. The volume of generated chemicals is at least one of: a volume of hydrocarbons, a volume of organic acids, a volume of alcohol, a volume of olefins and a volume of N-rich organic compounds.

In specific embodiments of the invention, a system is provided. The system comprises a reverse water gas shift reactor, an electrolyzer having an anode area and a cathode area, a means for supplying a volume of carbon dioxide to the reverse water gas shift reactor, a means for generating, using the volume of carbon dioxide and the reverse water gas shift reactor, a volume of carbon monoxide in a reverse water gas shift reaction, a means for supplying the volume of carbon monoxide to a cathode area of an electrolyzer, and a means for generating, using the electrolyzer and a reduction of the volume of carbon monoxide and an oxidation of an oxidation substrate, a volume of generated chemicals. The volume of generated chemicals is at least one of: a volume of hydrocarbons, a volume of organic acids, a volume of alcohol, a volume of olefins and a volume of N-rich organic compounds.

DETAILED DESCRIPTION

Figure 1:
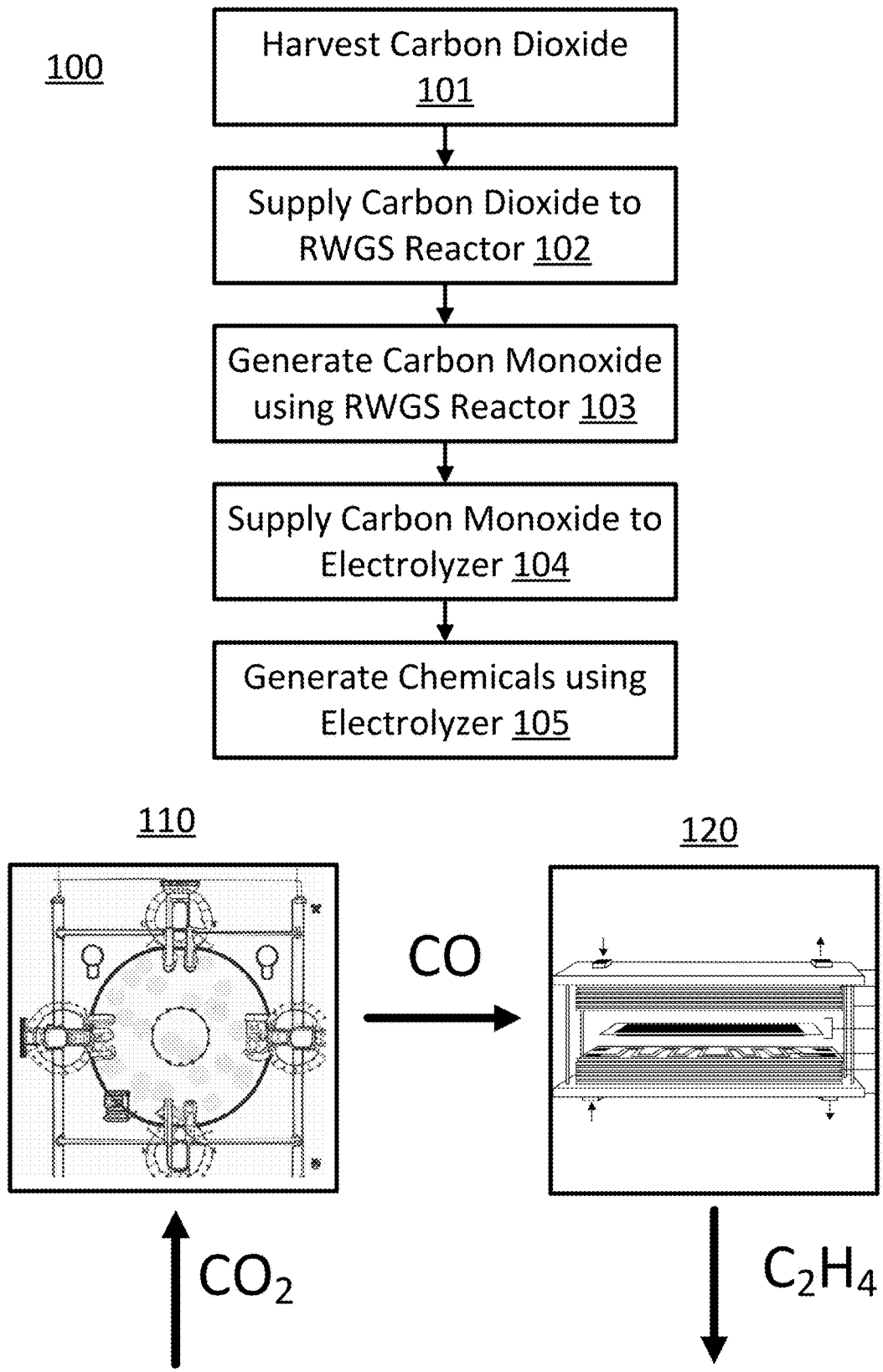
FIG. 1 illustrates a flow chart for a set of methods for operating a tandem reactor for the valorization of carbon dioxide using RWGS reactions in accordance with specific embodiments of the inventions disclosed herein.

Methods and systems related to the valorization of carbon dioxide using RWGS reactions in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Instead of performing low temperature carbon dioxide electrolysis to obtain unsaturated chemicals such as but not limited to olefins, carboxylic acids, and alcohols, reducing carbon monoxide in an electrolyzer is advantageous in maintaining low total energy demand. Carbon monoxide is the key intermediate towards value-added products when carbon dioxide is reduced in an electrolyzer. Unlike carbon dioxide, carbon monoxide is a non-acid gas that does not rapidly react with hydroxide ions to form anionic species. In an electrolyzer using alkaline electrolyte and supplied carbon monoxide, carbon monoxide can be competently reduced by metallic electrodes to valuable hydrocarbons, olefins, alcohols, and carboxylic acids. Because of this, an electrolyzer supplied with carbon monoxide can be operated in alkaline conditions and thus lower the energy use of the electrolysis process.

A key technology gap that has hindered the wider implementation of carbon monoxide electrolyzers is the lack of a sustainable source of carbon monoxide. One reason it has not been obvious to integrate a RWGS reactor with carbon monoxide electrolyzers is because RWGS reactors are typically configured to produce mixtures of carbon monoxide, carbon dioxide, and water that can then supply thermo-chemical reaction systems that are insensitive to the presence of gas mixtures, such as but not limited to the Fischer-Tropsch, methanation, and methanol synthesis processes. In contrast, the performance of carbon monoxide electrolyzers is very sensitive to the composition of the electrolyzer gas supply. Supplied with low-carbon dihydrogen and carbon dioxide, a RWGS and gas separation system can function as a sustainable source of carbon monoxide for a carbon monoxide electrolyzer, and thus enable the low-carbon production of small molecules.

The factors above motivate the electrolysis of carbon monoxide sourced from RWGS instead of carbon dioxide in an electrolyzer that uses alkaline electrolyte. There is a carbon emission benefit attained when the carbon monoxide used for a carbon monoxide electrolyzer is ultimately sourced from carbon dioxide and the process is powered by low-emissions energy input, because the condensed-phase products of the carbon monoxide electrolyzer will have effectively sequestered the carbon dioxide converted. Thus, it is beneficial to integrate a carbon monoxide electrolyzer with an upstream carbon dioxide-to-carbon monoxide conversion system. In addition to RWGS, there are several other technology pathways to convert carbon dioxide to carbon monoxide. The low-temperature electrolysis of carbon dioxide to carbon monoxide suffers from high energy requirements and thus cost because of the reaction of carbon dioxide with alkaline equivalents, as described above.

One barrier to the industrial adoption of RWGS reactors is the necessity of dihydrogen as an input, which is typically generated using energy intensive processes. Recirculating dihydrogen from process units downstream of the RWGS reactor back into the RWGS reactor is not obvious but an important feature of specific embodiments of the inventions disclosed herein for reducing the energy demand of the RWGS reactor and the overall integrated system. Because RWGS is typically configured to produce mixed carbon monoxide and dihydrogen streams by design, separating carbon monoxide to high purity and recirculating dihydrogen back to hydrogenate carbon dioxide has not been standard practice. The recirculation of dihydrogen within and back into the RWGS process chain can serve to maximize the utilization of dihydrogen fed into the RWGS process, reducing the amount of dihydrogen that would otherwise have to be supplied exogenously.

A feature of specific embodiments of the inventions disclosed herein is the recirculation of dihydrogen from the carbon monoxide electrolyzer back into the RWGS process chain, which represents an opportunity to recover energy losses associated with the parasitic generation of dihydrogen during carbon monoxide electrolysis. Novel carbon monoxide electrolyzers exhibit Faradaic efficiencies for dihydrogen generation up to 80%, meaning that depending on operating conditions, a substantial portion of supplied electric power is lost to the reduction of water or protons to dihydrogen. Dihydrogen derived from carbon monoxide electrolysis can be valorized by separating it from the other components of the carbon monoxide electrolysis. However, doing so may not be economically viable because of the high cost of producing dihydrogen using an electrolyzer optimized for carbon monoxide reduction relative to an electrolyzer optimized for dihydrogen generation. Additionally, valorizing dihydrogen into commercial grade may require other downstream capital equipment and process steps, such as compression and transportation, that may be prohibitive to implement for the operator of a carbon monoxide electrolysis plant. Thus, the energy losses associated with generating parasitic dihydrogen during carbon monoxide electrolysis can be partially recovered using the RWGS unit while simultaneously reducing the exogenous dihydrogen demand of RWGS, translating to process synergy.

In specific embodiments of the invention, a carbon monoxide electrolysis process downstream of the RWGS process chain can produce sufficient dihydrogen to supply the RWGS process, reducing the demand on upstream dihydrogen sources. In these embodiments, the carbon monoxide electrolyzer is operated at high current densities (e.g., above 200 mA cm$^{-2}$) with a high proportion (>20%) of dihydrogen at its output, increasing the productivity of the integrated process while reducing capital expenditures on the size of the carbon monoxide electrolyzer. In addition to reducing the demand of the RWGS on an upstream process providing dihydrogen (e.g., such as a dedicated dihydrogen electrolyzer or an industrial dihydrogen waste stream). Reduced upstream dihydrogen demand also enables more flexible and cost-effective integration scenarios, such as integration with smaller upstream dihydrogen sources, reduced demand for renewable power and associated infrastructure, and reduced minimum capital intensity for project viability. In specific embodiments of the invention, the carbon monoxide electrolyzer produces sufficient dihydrogen such that no additional dihydrogen is provided to the process chain, and all the dihydrogen required is generated by the carbon monoxide electrolyzer and separation unit.

Figure 15:
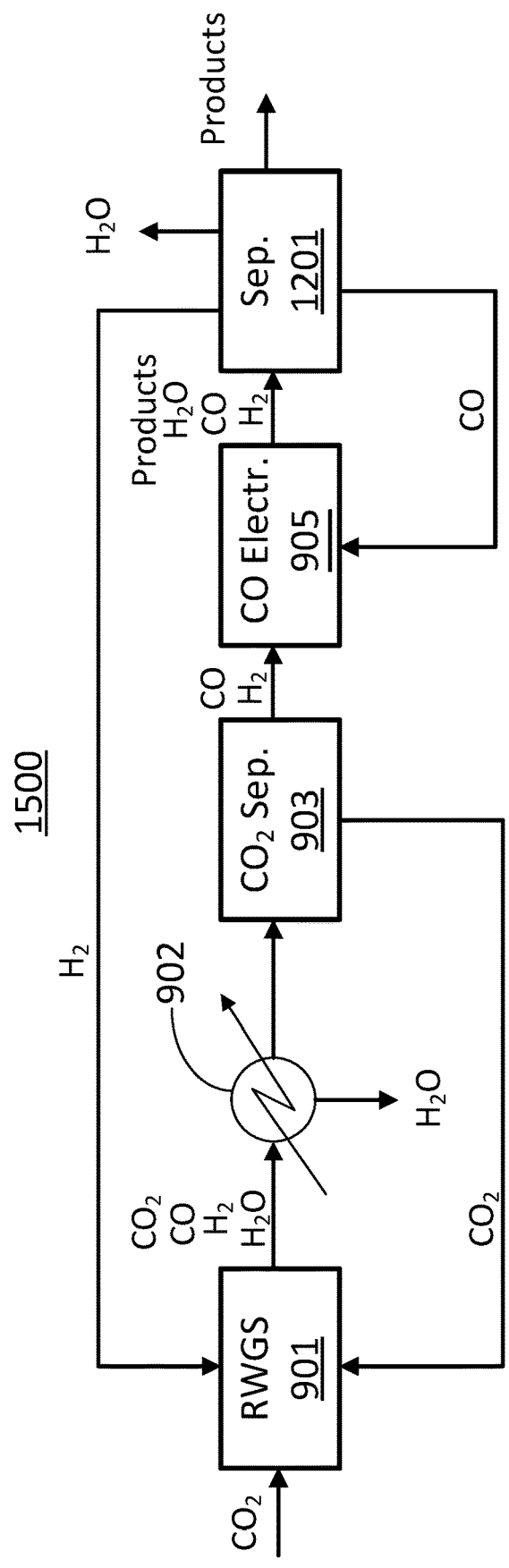
FIG. 15 illustrates a block diagram of a tandem carbon dioxide valorization reactor that supplies dihydrogen from the electrolyzer to the RWGS reactor and the RWGS reactor does not receive any dihydrogen from another source external to the reactor in accordance with specific embodiments of the inventions disclosed herein.

In specific embodiments of the invention, a start-up period of the tandem process chain is executed without exogeneous dihydrogen input such as is in the reactor illustrated in FIG. 15. Within a limited time interval when the process chain is first activated, the carbon monoxide electrolyzer, which can be operated without a carbon monoxide gas input, can be controlled to produce dihydrogen, which can then be recirculated into an upstream RWGS reactor to which only a carbon-dioxide-rich gas is fed. Following this start-up period, the electrolyzer downstream of the RWGS process chain will then start to convert carbon monoxide to products as carbon monoxide is produced and separated in the RWGS process chain and fed into the electrolyzer. In this specific embodiment, the process chain embodies a novel feedback loop, wherein if insufficient carbon monoxide is provisioned by the RWGS process chain to the carbon monoxide electrolyzer, the downstream electrolyzer will then proceed to produce a higher proportion of dihydrogen. The increased production of dihydrogen at the electrolyzer that is then recirculated back to the RWGS process chain increases the amount of carbon monoxide produced at the RWGS process chain and provided to the electrolyzer, which then increases the carbon monoxide to products conversion rate at the electrolyzer. For a given relative size of the electrolyzer, the RWGS reactor, and associated separation units, a steady-state carbon monoxide conversion rate can then be attained that depends in large part on the current density of the electrolyzer, the system's separation efficiencies, and the conversion rate at the RWGS process chain. In this specific embodiment, the RWGS process chain and carbon monoxide electrolyzer and associated separation systems must be sized appropriately relative to the overall system to ensure stability. For example, high current densities must be enforced at the electrolyzer to ensure sufficient dihydrogen flow rate to the RWGS process chain.

A unique advantage of specific embodiments of the invention disclosed herein arises from the fact that an upstream RWGS and gas separation process chain is uniquely suited to accept and valorize recirculated dihydrogen from a downstream electrolyzer system. For example, surplus dihydrogen cannot be introduced into the anode of an O-transporting SOEC, because of the fire and explosion risk of mixing inlet dihydrogen with electrogenerated oxygen. A similar safety problem is encountered in any carbon dioxide to carbon monoxide conversion system that co-produces oxygen or some other substance capable of oxidizing dihydrogen. In another example, recirculating excess dihydrogen from a downstream carbon monoxide electrolyzer back into a low-temperature carbon dioxide-to-carbon monoxide electrolyzer could reduce the efficiency of the carbon dioxide electrolyzer, because the partial pressure of carbon dioxide entering the electrolyzer at the same total pressure would be reduced.

Heat coming from both the RWGS process chain, including the heaters, and electrolyzer can be valorized and reduce the heat demand of process subunits. A key feature of the RWGS is the endothermicity of the reaction, which imposes a necessity to apply external heating or energy to the system. To reduce the amount of external heat applied, the gas stream leaving the RWGS reactor is typically at high temperature and can be harvested using heat exchangers to power downstream processes such as gas separation and compression and/or liquid product distillation. The heat can also be used to preheat the process gas stream of the RWGS reactor or recirculated around the RWGS reactor to provide process insulation. Additionally, the heat from the RWGS reactor can also be used to supply a carbon dioxide capture process upstream of the RWGS process. Electrolyzers can produce substantial excess heat because of Ohmic losses during operation. The electrolyzer waste heat can be used for processes with a lower temperature demand such as distillation and gas separation or be valorized separately from the core RWGS-carbon monoxide electrolyzer process chain for general heating use.

When the RWGS reaction is performed using a reaction system involving or driven by a plasma, temperatures are generally cooler than those when the RWGS is powered by heat provided externally. In a tandem system involving a plasma-driven RWGS reaction in a plasma-based RWGS reactor and a carbon monoxide electrolyzer, a larger portion of the energy input of the system could be derived from low-carbon electrical power. Unlike high-temperature RWGS reactors, integrating a carbon monoxide electrolyzer with a low-temperature RWGS reactor can enable higher system compatibility with the intermittency of power inputs (e.g., from intermittent renewable energy), and more flexible operation as the output of each unit in the process chain in proportional to the input electrical power.

The synergies obtained from the combination of RWGS and carbon monoxide electrolysis are not obvious in part because typical thermochemical carbon monoxide-upgrading processes implemented downstream of a RWGS reactor do not produce dihydrogen. For example, in the case of methanol synthesis (eq. 7) or Fischer-Tropsch synthesis, dihydrogen is also consumed as a feedstock in the thermochemical step after RWGS, and typically no dihydrogen is produced by syngas-consuming thermochemical processes. Therefore, there is limited opportunity to recover energy losses by performing a recirculation step of parasitic or excess dihydrogen because both the RWGS and methanol synthesis/Fischer-Tropsch synthesis require additional exogenous dihydrogen. In contrast, the parasitic production of dihydrogen in carbon monoxide reduction provides a way to reduce the dihydrogen demand of the RWGS reaction and recover the parasitic energy loss of generating dihydrogen in the CO electrolyzer.

$$CO_2 + H_2 \rightleftharpoons CO + H_2O \qquad (6) \text{ RWGS}$$

$$2CO_2 + 3H_2 \rightleftharpoons CH_3OH + H_2O \qquad (7) \text{ MeOH synthesis}$$

FIG. 1 illustrates a flow chart 100 for a set of methods for the valorization of carbon dioxide using RWGS reactions in accordance with specific embodiments of the inventions disclosed herein. FIG. 1 includes a step 101 of harvesting a volume of carbon dioxide. The carbon dioxide can be the byproduct of and be harvested from an industrial process such as power generation, the production of chemicals and materials, or from the capture of carbon dioxide from any carbon dioxide emission source. There are several industrial processes that emit large amounts of carbon dioxide into the atmosphere, but which can also be used to harvest the carbon dioxide in step 101.

Flow chart 100 continues with a step 102 of supplying the volume of carbon dioxide harvested in step 101 to a RWGS reactor 110. The step can involve provisioning the carbon dioxide through a fluid connection from a carbon storage tank. The fluid connection can have one or more separators to filter out certain chemicals that are not meant to be applied to the RWGS reactor. Specific separators may be used to remove hydrocarbon compounds, oxygen and/or sulfur-containing, phosphorous-containing, or reactive nitrogen-containing compounds. Particulate and/or dust filtering systems may also be used to remove solid contaminants from the carbon dioxide-containing stream that have negative effects on the performance of the RWGS reactor. The fluid connection could be provided through one or more valves, one or more seals, and/or one or more regulators or additional instrument in a pipe or other connection coupling a carbon dioxide source to the RWGS reactor. The fluid connection can also include valves and conduits that allow the carbon dioxide to be mixed with dihydrogen in different proportions to provide an optimal mix of dihydrogen and carbon dioxide to the RWGS reactor. The fluid connection can connect to a carbon dioxide source such as a pressurized storage tank or a separator directly connected to the output flue gas of an industrial process. The fluid connection can also connect to a dihydrogen source such as a pressurized storage tank. The fluid connection can also include feedback conduits to obtain carbon dioxide or dihydrogen from downstream sources in a tandem reactor to which the RWGS reactor 110 is a part as will be described below. The dihydrogen source can also be output from a water electrolyzer such as but not limited to an alkaline electrolyzer, a proton-exchange-membrane-based electrolyzer, an alkaline-exchange-membrane-based electrolyzer, a solid-oxide electrolyzer, a hydrocarbon pyrolysis reactor. The dihydrogen source can also be dihydrogen produced by petroleum refineries, dehydrogenation processes, steam reforming plants, and polymerization processes.

Flow chart 100 continues with a step 103 of generating, using the volume of carbon dioxide provided in step 102 and the RWGS reactor 110, a volume of carbon monoxide in a RWGS reaction. The carbon dioxide provided in step 102 can be combined with dihydrogen prior to being provided to the RWGS reactor. The RWGS reactor can convert the carbon dioxide and dihydrogen into carbon monoxide as an oxygen atom is split off from the carbon dioxide and combined with the dihydrogen to form water while leaving behind carbon monoxide. The RWGS reactor can operate by passing a mixture of carbon dioxide and dihydrogen over a catalyst at high temperatures (e.g., 100-1200° C.) and medium pressure (e.g., 1-30 bar). The catalyst facilitates the reaction between the carbon dioxide and dihydrogen to produce carbon monoxide and water.

Flow chart 100 continues with a step 104 of supplying the volume of carbon monoxide generated in step 103 to a cathode area of an electrolyzer 120. The electrolyzer can include a cathode area and an anode area. The cathode area can include a cathode input for receiving the feedstock for a reduction reaction (e.g., the carbon monoxide) and a cathode output for removing at least one product of the reduction reaction. The anode area can include an anode input for receiving the feedstock for an oxidation reaction and an anode output for removing at least one product of the oxidation reaction. The electrolyzer can also include a separating layer or separating area between the cathode and the anode. The providing of the carbon monoxide from the RWGS reactor to the electrolyzer can be done using a fluid connection. The fluid connection could be provided through one or more valves, one or more seals, and/or one or more regulators or additional instrument in a pipe or other connection coupling an output of the RWGS reactor to the electrolyzer. The fluid connection can have one or more separators to remove unwanted chemicals from the output of the RWGS reactor. The fluid connection can also include one or more valves and conduits to allow additive chemicals to be supplied with the carbon monoxide to the anode of the electrolyzer. The fluid connection can also include feedback conduits to obtain carbon monoxide from downstream sources in a tandem reactor to which the electrolyzer 120 is a part as will be described below.

The supplying of the carbon monoxide can involve harvesting the entire volume of carbon monoxide generated by the RWGS reactor or a portion of the volume of carbon monoxide generated by the RWGS reactor. The volume of carbon monoxide can be harvested as part of a carbon-monoxide-containing stream in which the volume of carbon monoxide is mixed with other chemicals or impurities. The valves and seals and any other necessary instrument may be configurable to route the carbon monoxide to the electrolyzer at a first time and then to a second system at a second time. The connection or pipe may be coupled to an accumulation tank or set of tanks located between the electrolyzer and the RWGS reactor in order to accumulate excess carbon monoxide in case of any discrepancies between the speed of the RWGS reactor and the electrolyzer. Such accumulation tank or set of tanks could also be used to temporarily store carbon monoxide during periods of high electricity cost when running the electrolyzer would be prohibitively expensive.

The volume of carbon monoxide can be mixed with additional fluids in order to form a cathodic input fluid or can be kept pure such that the cathodic input fluid was pure carbon monoxide. This step can involve transporting tanks of carbon monoxide from an area at which the carbon monoxide was harvested and connecting it to a connection or pipe coupled to the cathode area of an electrolyzer. The step can also involve storing the carbon monoxide in tanks temporarily until the price of electricity declines and then supplying the stored carbon monoxide to the electrolyzer when it becomes more economical to do so. The step can alternatively involve routing the carbon monoxide through a connection or pipe directly from a RWGS reactor to an electrolyzer in the same industrial facility.

Both the harvesting of the carbon dioxide and the supplying of the carbon monoxide can be conducted in a single facility and can involve direct or indirect harvesting and supplying. In indirect harvesting, the carbon monoxide from RWGS reaction can be piped to storage tanks and then sealed off. The tanks can then be transported to where the carbon monoxide will be utilized or be stored locally and used at a later time. In contrast, in direct harvesting, the carbon monoxide from the RWGS reaction can be directly piped from a reactor or other system in which the RWGS reaction occurs to an electrolyzer or other system (e.g., one or multiple intermediate steps may be conducted before the carbon monoxide is delivered to the electrolyzer) in which the carbon monoxide will be utilized. For example, a dihydrogen production line could be in the same facility as electrolyzer 120 and RWGS reactor 110 and the carbon dioxide generated by the dihydrogen production line could be harvested and provided to the RWGS reactor 110 directly. In these embodiments, some of the dihydrogen produced by the production line could also be combined with the carbon dioxide and fed to the RWGS reactor 110 as a feedstock. The carbon monoxide produced by the RWGS reactor 110 could then likewise be provided directly to the electrolyzer 120 or with one or more intermediate steps between RWGS reactor 110 and electrolyzer 120 to pre-treat the carbon monoxide containing stream prior to it being fed to the electrolyzer. As another example, the harvesting of the carbon monoxide can be indirect harvesting in which the RWGS reactor is fluidly connected to one or more storage tanks which store the carbon monoxide for transportation and/or use at a later time. In either case, two or more of the carbon dioxide source, the RWGS reactor, and the electrolyzer can be in a single industrial facility such as a refinery, biorefinery, chemical plant, industrial laboratory, waste treatment plant or other facility. In specific embodiments of the invention, a single industrial process or industrial facility could produce both carbon dioxide and carbon monoxide, and both chemicals could be separated and then provided to the same tandem reactor with the carbon dioxide being introduced at the RWGS reactor input and the carbon monoxide being introduced at the fluid connection between the RWGS reactor the electrolyzer (i.e., by being mixed with the carbon monoxide produced by the RWGS reactor).

Flow chart 100 continues with a step 105 of generating, using the electrolyzer 120 and a reduction of the volume of carbon monoxide and an oxidation of an oxidation substrate, a volume of generated chemicals. The oxidation substrate can be water, dihydrogen gas, halides, alcohols, organic waste such as but not limited to glycerol, or any other oxidation substrate. The volume of generated chemicals can include at least one of: a volume of hydrocarbons, a volume of organic acids, a volume of alcohol, a volume of olefins and a volume of N-rich organic compounds. The electrolyzer 120 can generate the volume of generated chemicals on either the anode or cathode. The electrolyzer 120 can be energized in order to initiate a pair of reduction and oxidation reactions at the cathode and anode respectfully to generate the volume of generated chemicals.

In specific embodiments of the invention, the RWGS reactor will utilize one or more catalysts to facilitate the conversion of carbon dioxide into carbon monoxide. The RWGS reactor can be a single heterogenous catalyst or a set of heterogeneous catalysts. The RWGS reactor can include an active metal and metal oxide support catalyst. The active metal or metal oxide catalyst can include at least one of: Pt, Pd, Rh, Ru, Au, Fe, Mo, Cu, Co, Cr, In, Ba, Zr, and Ni. Among these active metals, the first five are effective because of their high hydrogenation activity. However, Cu and Ni are promising for RWGS reactors due to their relatively low price along with high activity and selectivity. However, Cu-oxide and Ni-oxide catalysts have a tendency to deactivate in RWGS because of the aggregation of Cu and Ni particles at the high temperatures required for RWGS reactor operation. In specific embodiments of the invention, the RWGS reactor can use an active metal such as but not limited to Pt, Mo, Co, or Fe supported by a metal oxide support catalyst such as but not limited to $CeO_2$, $ZrO_2$, or $Al_2O_3$. Other catalysts that can be used for RWGS include transition metal carbides such as MoC and WC and metal sulfides such as lanthanide sulfides and molybdenum sulfides and metal phosphides. Other catalyst formulations based on alkali metal carbonates (e.g., $K_2CO_3$, $Na_2CO_3$, $Cs_2CO_3$, $Rb_2CO_3$) which may be dispersed on mesoporous supports (e.g., carbon, zeolites, $SiO_2$, $Al_2O_3$, $TiO_2$ and other metal oxides and ceramics) can also convert carbon dioxide to carbon monoxide at high efficiency, lower temperatures, high stability, and resilience to poisons in the feed gas.

Figure 2:
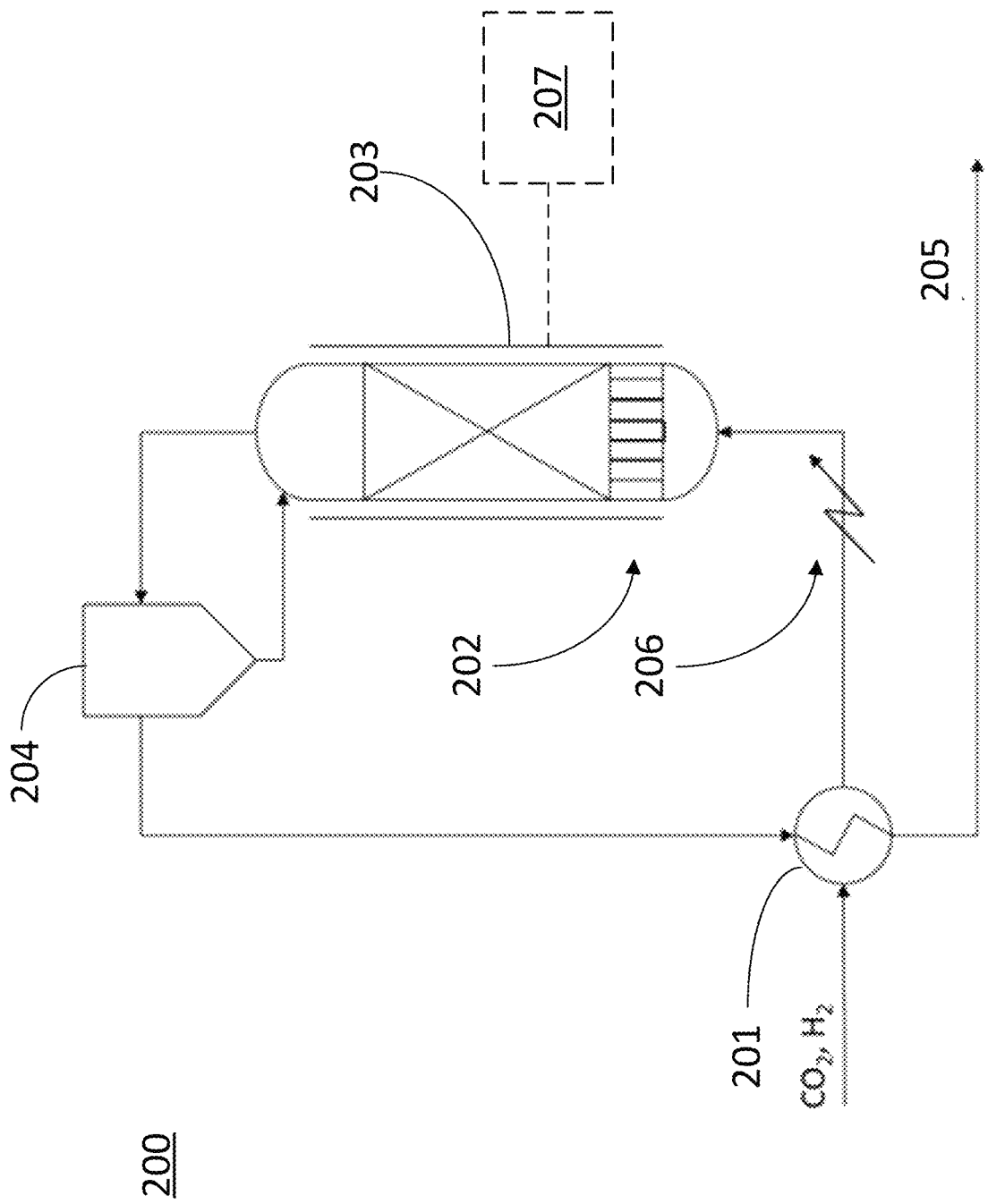
FIG. 2 illustrates a block diagram of a RWGS reactor in accordance with specific embodiments of the inventions disclosed herein.

The RWGS reactors operated at elevated temperature in accordance with specific embodiments of the inventions disclosed herein can be classified in two main categories: (1) fixed bed; and (2) fluidized bed. The main differences are the catalyst shape and gas superficial velocity. Catalyst shapes include, as nonlimiting examples, pellets, beads, monolith, foam and powder shapes. Fixed bed reactors, using catalyst under the form of pellets or beads (1-100 mm), have the benefit of simplicity. However, they present some limitations in terms of heat transfer. Some hot spots and cold spots can appear along the reactor respectively leading to catalyst activity losses (sintering, coking) and carbon monoxide selectivity loss (methane production). In fluidized beds, the catalyst is in the form of powder (<500 μm) in suspension in the gas stream. These reactors provide enhanced heat transfer and present a homogeneous temperature all along the catalytic bed. However, the catalyst must be specifically formulated to resist attrition, enforce a long lifespan, and limit catalyst regeneration. Either fixed bed reactors or fluidized bed reactors will be based on a stainless steel insulated/heat traced cylindrical vessel as illustrated in FIG. 2. This vessel contains a gas distribution system at the bottom of the reactor followed by the bed section. Several reactor vessels can be placed in series to increase the yield. Moreover, an inter-stage cooling/condensing/reheating step between each reactor can be implemented. In case of a fluidized bed, a filter and/or a cyclone can be installed just downstream of the reactor to capture and alternatively recirculate the fine particles of the catalyst. The implementation of an electrolyzer downstream of an RWGS reactor may require some modifications to the design of a RWGS reactor, such as the addition of fluid ports to integrate the dihydrogen recirculation loop.

FIG. 2 illustrates a block diagram 200 of a RWGS reactor in accordance with specific embodiments of the inventions disclosed herein. Block diagram 200 includes a heat exchanger 201 into which a feedstock of carbon dioxide and dihydrogen are provided. The heated gas is then fed through a gas distribution system 202 to a catalytic fixed or fluidized bed reactor and insulation 203 as described above. The output of the reactor is fed to a particle filter or cyclone 204 which can return particles to the reactor especially in the case of a fluidized bed reactor. Gas products 205 which are generated in the reactor and pass through the filter or cyclone 204 are then processed by the heat exchanger 201 and output from the system. A heat make-up 206 is used to compensate the thermal loses and the endothermicity of the reaction. This make up can be carried out by an electrical heater or by the combustion of a fuel source. As mentioned, in specific embodiments of the invention, the RWGS reactor can be a plasma-based reactor. In such embodiments, the reactor could include a power supply such as high voltage power supply 207. High voltage power supply 207 is shown in phantom lines to indicate that it is not required in embodiments that do not utilize plasma-based reactors.

Figure 3:
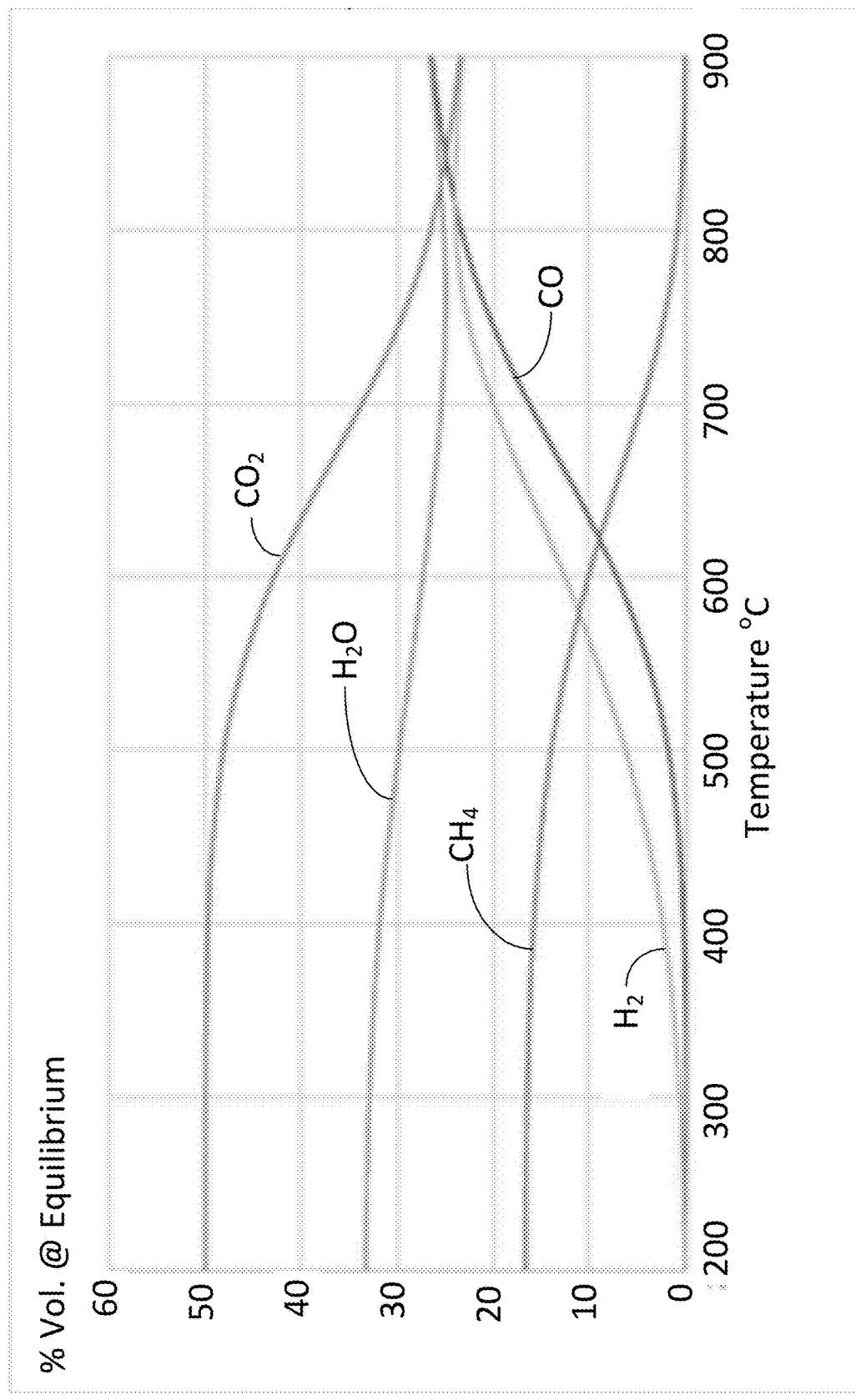
FIG. 3 illustrates a plot of the percentage volume at equilibrium of the products of a RWGS reactor at various temperatures in accordance with specific embodiments of the inventions disclosed herein.

To maintain a high carbon monoxide selectivity and limit the methane content in the outlet gas of the RWGS reactor, two solutions are available, either maintaining the temperature above 700° C. to thermodynamically avoid methane formation and/or enforcing very selective catalysis for RWGS to form carbon monoxide instead of methanation of the carbon dioxide. FIG. 3 illustrates line plots of the percentage volume at equilibrium of the output stream of a RWGS reactor across various temperatures which illustrates this point. Above 700° C., carbon monoxide selectivity to methane is thermodynamically higher than 90% and above 800° C. higher than 95%. In specific embodiments of the invention, a RWGS reactor is operated at 600-1000° C. Diminishing returns in carbon dioxide conversion and energy/process efficiency are encountered at temperatures above 1000° C., in addition to imposing material selection constraints, for example because steel reactors can degrade rapidly above 1000° C. under RWGS conditions. Operating catalytic RWGS reactors at this high level of temperature would lead to coke deposition on the surface of the catalyst, to sintering effect or phase segregation (thermal degradation) of the catalyst, and then to an enhanced loss of activity reducing the lifespan. It should be noticed that operating pressure does not impact the thermodynamic equilibrium. As the RWGS reaction is slightly endothermic, the inlet gas mix is usually heated above 800-900° C. to maintain the reactor temperature above 700-850° C. A feed/effluent heat exchanger (e.g., heat exchanger 201) is installed to get back the main part of the heat and limit the heat make-up. This heat make-up is still necessary to compensate the reaction endothermicity and the thermal losses. Heat makeup can be accomplished using methods such as, but not limited to, through an electrical heating system or by burning fuels such as natural gas. To avoid coke and/or methane formation and also to limit the energy consumption of the process, some low temperature reactors (200-600° C.) using specific catalyst formulations (e.g., dispersed alkali metal carbonates and others) can be used to obtain selectivity higher than 80-90%.

Another solution developed to minimize the energy consumption and increase the carbon monoxide production is RWGS chemical looping (RWGS-CL) reactors. In RWGS-CL process, a RWGS reaction is split in two phases, (1) the carbon dioxide reduction into carbon dioxide and (2) the dihydrogen oxidation into water. A circulating oxygen carrier material (metal oxide, ex: $FeO_{4/3}$) can assist in improving the reaction efficiency by acting as an oxygen carrier to promote acceptance of oxygen from carbon dioxide and donation of oxygen to dihydrogen. Reaction in two phases can reduce the water partial pressure in the carbon monoxide concentrated stream and displace the thermodynamic equilibrium to carbon monoxide production.

Dielectric Barrier Discharge (DBD) plasma reactors can also be implemented for the RWGS reaction. DBD plasma reactors are an example of plasma-based RWGS reactors. DBD reactors use metallic, metal oxide, or ceramic catalysts and can also be operated at ambient to moderate temperature (400° C.) and atmospheric pressure while resulting a high energy efficiency. The reactor architectures for DBD are varied but generally involve flowing carbon dioxide and/or dihydrogen into a gap between two electrodes, across which a voltage sufficient to generate a plasma is applied. The temperature, pressure, and composition of the reactor are controlled to optimize performance. The reaction is energized by the plasma and conversion of the input to carbon monoxide, water, and oxygen is achieved at the outlet. Reaction conditions must be controlled to avoid the buildup of oxygen in the reactor because of the safety risk of combining dihydrogen with oxygen, in addition to the undesired consumption of reducing equivalents from dihydrogen and oxygen.

Figure 4:
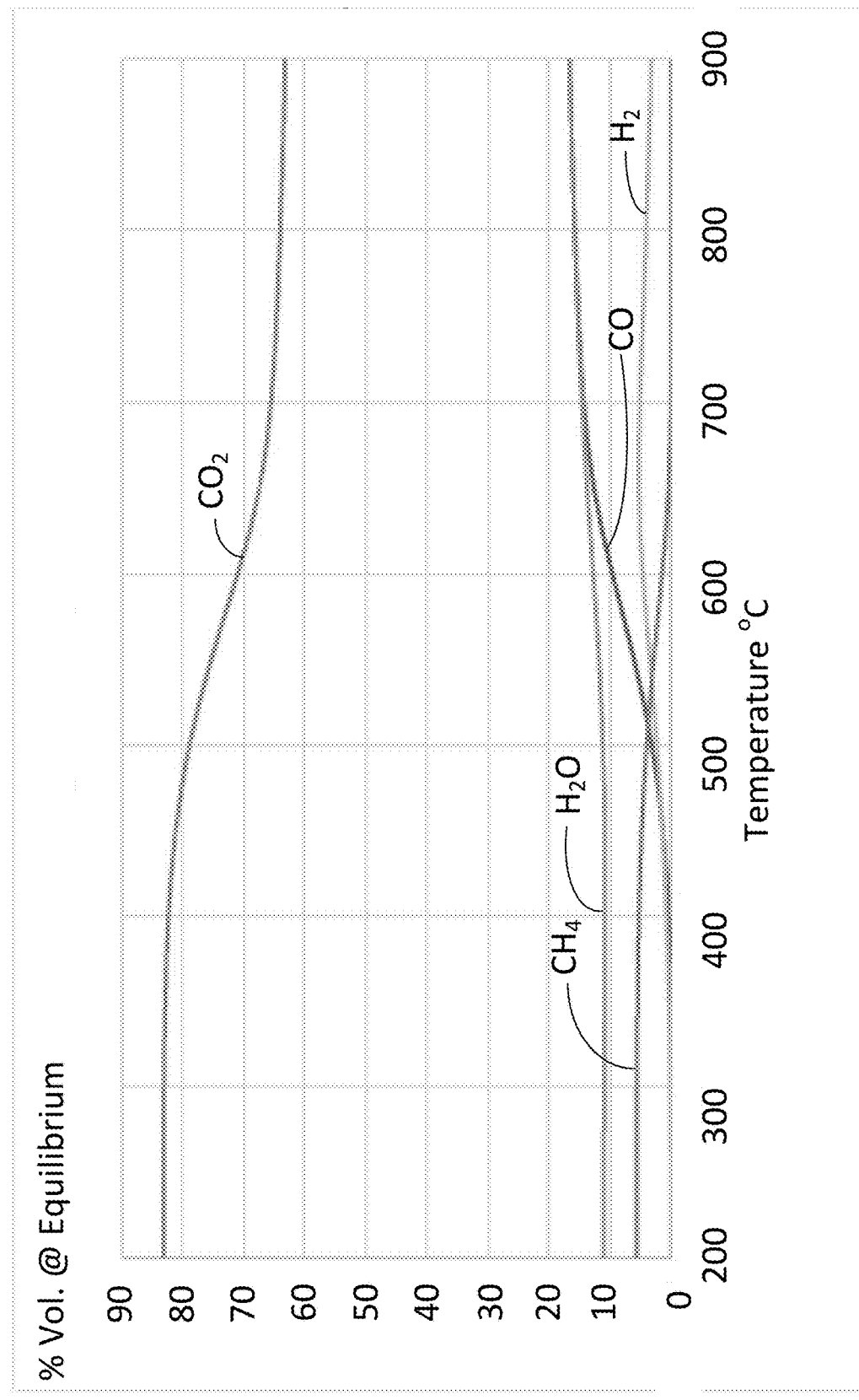
FIG. 4 illustrates a plot of the percentage volume at equilibrium of the products of a RWGS reactor with a different feedstock ratio at various temperatures in accordance with specific embodiments of the inventions disclosed herein.

The carbon monoxide to dihydrogen ratio produced by the RWGS system can be tuned by adjusting the amount of dihydrogen and carbon dioxide fed into the RWGS reactor and by adjusting the RWGS reactor temperature. In specific embodiments of the present inventions disclosed herein it is, counter to the principle of operation of traditional RWGS reactors used to produce syngas, beneficial to maximize the amount of carbon monoxide produced relative to dihydrogen. For example, an inlet composition of 80% carbon dioxide and 20% dihydrogen fed into the RWGS reactor can produce a stream largely composed of carbon dioxide and carbon monoxide at high temperature, with minimal dihydrogen. This is illustrated by a comparison of FIG. 3 and FIG. 4 because the plot in FIG. 3 is for a feedstock input ratio of 1:1 for carbon dioxide to dihydrogen while the plot in FIG. 4 is for a feedstock input ratio of 4:1 for carbon dioxide to dihydrogen. The composition in FIG. 4 is not normally accessed by RWGS reactors because they are configured to produce syngas for hydrogenation reactions, but such a carbon monoxide-rich outlet stream would be particularly advantageous for integration with a downstream carbon monoxide electrolyzer.

Maximizing the amount of carbon monoxide output from the RWGS reactor as compared to dihydrogen produces various benefits. For example, the amount of dihydrogen required as a feedstock for the RWGS reactor is reduced thereby minimizing the power input required for the operation of the overall production line. Furthermore, while in some embodiments the dihydrogen output from the RWGS reactor can be recirculated as an input to the RWGS reactor, the cost of separating the dihydrogen in order to do so is nontrivial. Prior to use as a feedstock in the RWGS system, the outlet gas stream of the carbon monoxide electrolyzer containing dihydrogen is partially purified to remove other gas components such as but not limited to carbon monoxide, carbon dioxide, methane, ethylene, and water. Then, the purified dihydrogen must be recompressed to the pressure required to operate the RWGS reaction, which incurs an energy cost. Minimizing the amount of dihydrogen produced by the RWGS process reduces this energy cost. Furthermore, in some embodiments a minimized amount of dihydrogen may obviate the need for a separation block at all as the carbon monoxide electrolyzer can operate with dihydrogen as an input. As such, approaches that minimize dihydrogen output from the RWGS reactor can result in both lower capital and operating expenses.

Downstream of the RWGS reactor, depending upon the specific embodiment of the invention, three main steps can be used to produce pure carbon monoxide for the electrolyzer: (1) cooling the gas to condense and remove the produced water; (2) removing carbon dioxide (e.g., using an amine scrubbing unit, or any of the separation methods described below) to separate and recirculate carbon dioxide upstream to the RWGS reactor; and (3) removing dihydrogen (e.g., using a membrane module or any of the separated methods described below) to separate and recirculate the dihydrogen upstream to the RWGS reactor. The configuration of each of the three steps downstream of the RWGS reactor can be set according to performance requirements of the electrolyzer (e.g., final CO, $CO_2$, $H_2O$, $CH_4$, and $H_2$ content) to minimize the production cost and energy consumption of the overall system.

The electrolyzer can have various architectures for the conversion of carbon monoxide into valuable chemicals. The electrolyzer can include an anode area and a cathode area. The carbon monoxide can be provided to the anode area. The useful chemicals can be produced in the cathode area, in the anode area, or in a separating area located between the cathode area and the anode area of the electrolyzer. The electrolyzer can be a single planar electrolyzer. The electrolyzer can be a stack of cells. The cells in the stack can utilize bipolar plates. The bipolar plates can be charged to initiate reactions within the reactor. The electrolyzer can also be a filter press electrolyzer or a tubular electrolyzer.

In specific embodiments of inventions disclosed herein, the dihydrogen or syngas production device is advantageously integrated with a carbon monoxide electrolyzer comprising a cathode area where carbon monoxide reduction takes place according to equation 8 below and an anode area where an oxidation reaction takes place on an oxidation substrate. The oxidation substrate can be water, dihydrogen, halides, organic waste or any other oxidation substrate. For example, the oxidation can involve water oxidation or dihydrogen oxidation according to equations 9 and 10 below respectively.

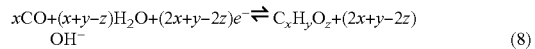
$$x\text{CO} + (x+y-z)\text{H}_2\text{O} + (2x+y-2z)e^- \rightleftharpoons \text{C}_x\text{H}_y\text{O}_z + (2x+y-2z)\text{OH}^- \quad (8)$$

$$2\text{H}_2\text{O} \rightleftharpoons 4\text{H}^+ + 4e^- + \text{O}_2 \quad (9)$$

$$\text{H}_2 \rightleftharpoons 2\text{H}^+ + 2e^- \quad (10)$$

Both the carbon monoxide and the oxidation substrate can be mixed with additive chemicals to alter the characteristics of the reactor and change the characteristics of the chemicals produced by the electrolyzer. For example, water and carbon monoxide can be combined to form a cathodic input fluid for the electrolyzer, while an oxidation substrate such as dihydrogen is provided on another connection coupled to an anode input of the electrolyzer. This type of reaction can be beneficial in tandem reactors that are in accordance with specific embodiments of the inventions disclosed herein because the RWGS reactor will generally already provide carbon monoxide with water mixed in and there will no longer be a need to separate out the water which can lead to a simpler and less expensive reactor design and to power savings for the operation of the tandem reactor.

The chemicals produced by the electrolyzer can vary in different specific embodiments of the inventions disclosed herein. The chemicals can be separated using a separating element such as a trap for liquid chemicals on the anodic or cathodic output of the electrolyzer or a separating area between the cathode area and anode area which has its own output from the electrolyzer. The chemicals produced can be removed from the electrolyzer in solid or gaseous form and can be removed from the cathodic or anodic output streams on the cathode or anode outputs of the electrolyzer, or from a separate output from a separating layer. Examples of such a separating layer are provided below. A single electrolyzer can produce chemicals in both gaseous and liquid forms simultaneously. Accordingly, the volume of chemicals generated in a step such as step 105 could include at least one of a volume of hydrocarbons, a volume of organic acids, a volume of alcohols, a volume of olefins and a volume of N-rich organic compounds, where the chemicals are in gaseous or liquid form. For example, the volume of generated chemicals could include a volume of gaseous hydrocarbon and a volume of liquid alcohol. As another example, the volume of generated chemicals could include a volume of gaseous hydrocarbons and a volume of organic acids. In a specific embodiment, the main targeted products are ethylene (in the gaseous product stream) and acetic acid/acetate (in the liquid product stream). In another embodiment, the main targeted product is propanol (in the liquid product stream).

In specific embodiments of the invention, the dihydrogen for the RWGS reactor can be supplied from a low-carbon-footprint dihydrogen-generating system.

In specific embodiments of the invention, the dihydrogen for the RWGS reactor can be supplied from a syngas evolution system operating on the same stream of carbon dioxide. The syngas evolution system can be part of a reactor such as those described in U.S. patent application Ser. No. 17/980,912 filed Nov. 4, 2022, which is incorporated by reference herein in its entirety for all purposes. The tandem reactors described in that prior application and the tandem reactors described in this application can be placed in the same industrial facility to provide synergistic benefits such as the production of dihydrogen for the RWGS reactor and the inclusion of two streams of useful chemicals from a single carbon dioxide source.

Figure 5:
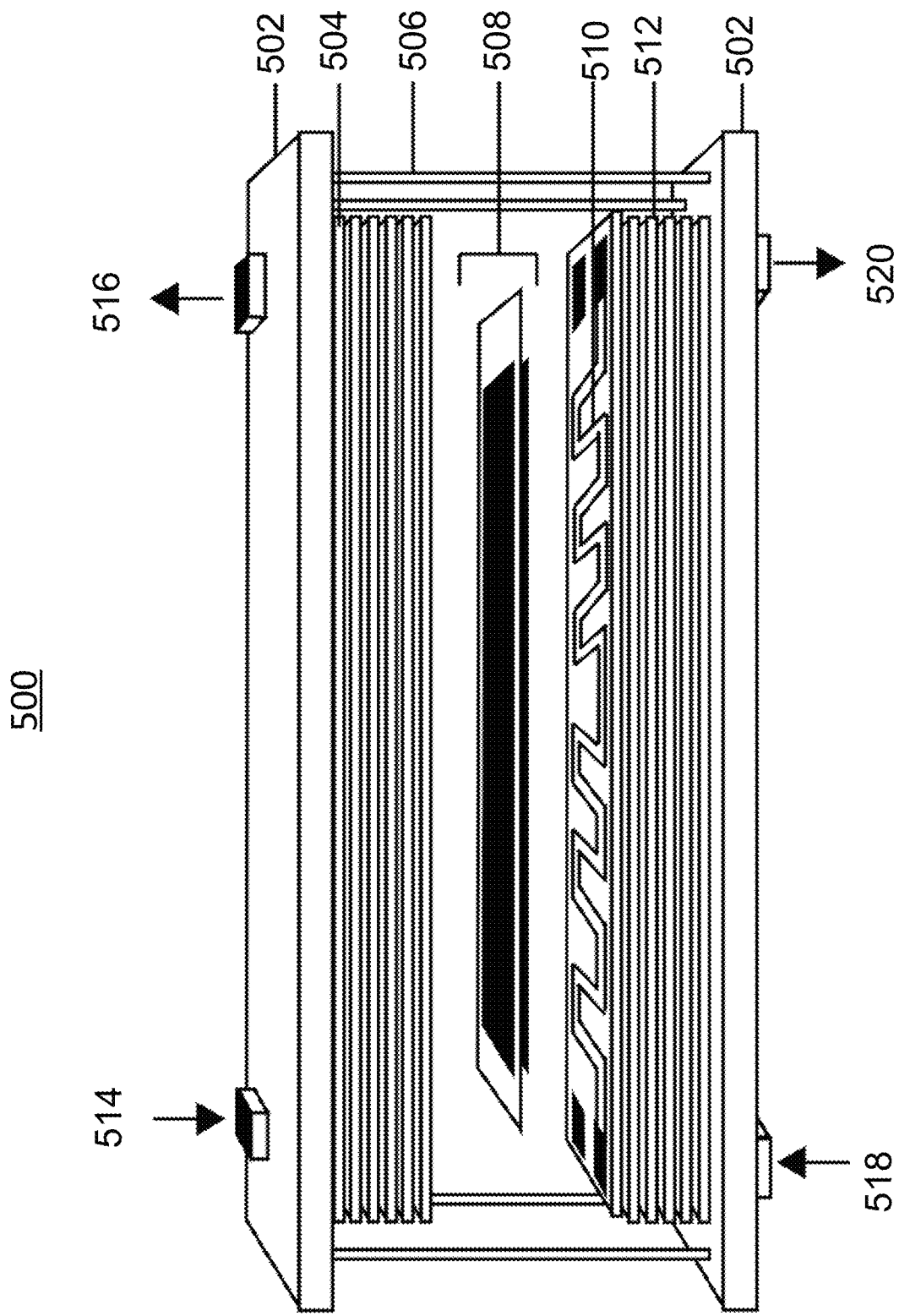
FIG. 5 illustrates an exploded block diagram of an electrolyzer in accordance with specific embodiments of the inventions disclosed herein.

The carbon monoxide electrolyzers used in accordance with this disclosure can comprise one or more electrocatalytic cells positioned on top or next to one another to increase the surface available for the reaction. They can be stacked on top of one another, and such stacks can also be parallelized. These cells may be connected in series or in parallel. Many different cell and stack configurations can be used for the electrolyzers in accordance with this disclosure. FIG. 5 provides a diagram of an electrolyzer 500 for explanatory purposes. The methods and systems disclosed herein are broadly applicable to electrolyzers that can receive carbon inputs such as carbon monoxide generally and electrolyzer 500 is provided as a nonlimiting example of one such electrolyzer.

FIG. 5 includes an illustration of an electrolyzer 500 in the form of a stack in accordance with specific embodiments of the inventions disclosed herein. The electrolyzer 500 includes end plates such as end plate 502, monopolar plates such as monopolar plate 504, rigid bars such as rigid bar 506, a membrane electrode assembly (MEA) such as MEA 508 or any form of catalytic core, a flow field such as flow field 510, and bipolar plates such as bipolar plate 512. Again, while the example of an MEA is being provided, this is only an example, and electrolyzers with any form of catalytic cores can be used in accordance with the embodiments disclosed herein. Additionally, the electrolyzer 500 includes an inlet 514 and an outlet 516 for an anodic stream, as well as an inlet 518 for a cathodic stream and an outlet 520 for the cathodic stream. The polar plates, such as monopolar plate 504 and bipolar plate 512 can be part of the cells in the stack. The stack can also comprise gasketing, sealing of any shape, insulating layers and materials that have not been represented in the FIG. 5 for clarity.

In an electrolysis stack, subsequent cells can be physically separated by bipolar plates (BPPs), such as bipolar plate 512 in FIG. 5, that can ensure mechanical support for each of the electrolysis cells on each side of the BPP. BPP can also ensure electrical series connection between subsequent electrolysis cells and introduce/remove the reactants/products respectively. At the end of the stack, only one side of the plate can be in contact with the terminal cell; it is then called a monopolar plate, such as monopolar plate 504 in FIG. 5. At the extremities of the stack, current collectors can allow connection to an external power supply, which can also be used, among other elements, for electrical monitoring of the stack. The stack can be assembled within a stack casing allowing its mechanical support and compression, as well as provisioning and transporting the reactant and product streams to and from the stack. The stack casing can comprise end plates that ensure electrical isolation of the stack and provide the inlet and outlets for the reactant and product streams. Alternatively, insulator plates can be placed between end plate such as end plate 502 and the monopolar plate such as monopolar plate 504 to ensure electrical insulation of the stack versus the stack casing depending on the material of the end plate.

The carbon monoxide electrolyzers can take as an input, a cathodic input stream (e.g., stream enriched in carbon monoxide) and an anode input stream. The cathodic input stream can be provided to an inlet such as inlet 518. The anodic input stream can be provided to an inlet such as inlet 514. The cathodic stream and anodic stream can flow through the stack from the inlets to the outlets and be distributed through the flow channels, such as those in flow field 510 of each cell to each cathodic and anodic area separately. The anodic stream and cathodic stream would flow through separate channels on either side of the cell. Alternatively, at least one of the cathodic and anodic streams may be provided to each cell individually instead of through a connection crossing all the plates. In this case, each cell has a dedicated fluid inlet and outlet for this cathodic and/or anodic stream. The nature of the anodic stream can be determined by the nature of the targeted oxidation reaction (such as, but not limited to, water oxidation, dihydrogen oxidation, chloride oxidation, halide oxidation, hydrocarbon oxidation, and waste organic oxidation). When electrically powered, the carbon monoxide electrolyzer carries out the concomitant reduction of carbon monoxide and oxidation of the chosen oxidation substrate to produce added-value chemicals such as hydrocarbons, organic acids and/or alcohols and/or N-containing organic products in the output cathodic stream separated from the anodic stream where the oxidation products are specifically collected. For example, the generating of chemicals using carbon monoxide and the electrolyzer in step 105 could involve supplying the volume of carbon monoxide to a cathode area of the electrolyzer as a cathodic input fluid and supplying a volume of water to an anode area of the electrolyzer as an anodic input fluid.

In specific embodiments of the invention, the anode area could comprise an anodic catalyst layer able to oxidize a substance to produce a product and protons. The catalyst can comprise one or more: molecular species, single-metal-site heterogeneous compounds, metal compounds, carbon-based compounds, polymer electrolytes (also referred to as ionomers), metal-organic frameworks, metal-doped covalent organic framework or any other additives. The molecular species can be selected from metal porphyrins, metal phthalocyanines or metal bipyridine complexes. The metal compound can be under the form of metal nanoparticles, nanowires, nano powder, nanoarrays, nanoflakes, nanocubes, dendrites, films, layers or mesoporous structures. The single-metal-site compounds can comprise a metal-doped carbon-based material or a metal-N—C-based compound. Anodic catalyst species used for this purpose could include, but are not limited to, metals and/or ions of: Ir, Co, Cu, Ni, Fe, Pt, Rh, Re, Ru, Pd, Os, Mo and mixture and/or alloys thereof. For example, the anodic catalyst could be Ni such that the electrolyzer assembly included a nickel-based anode. The polymer electrolyte can be selected out of the same materials as the one used for the described membranes. The carbon-based compounds can comprise carbon nanofibers, carbon nanotubes, carbon black, graphite, boron-doped diamond powder, diamond nanopowder, boron nitride or a combination thereof. The additives can be halide-based compounds including F, Br, I, and Cl. The additives can be specifically dedicated to modify hydrophobicity such as treatment with polytetrafluoroethylene (PTFE), sulfonated tetrafluoroethylene based fluoropolymer-copolymers or another hydrophobic polymeric ionomer additive, or carbon black. The anodic catalyst may be chosen to tune the performance and net product stream of the electrolyzer by choosing catalysts that are more or less capable of anodic alcohol oxidation to the corresponding carboxylic acid, aldehyde, or carbon dioxide.

The anodic catalyst may be deposited onto a gas diffusion layer or a porous transport layer or any other support that facilitates the diffusion of gas from the interface of the anode to a purified gas stream separated from the cathodic stream. The anode area could also include a gas diffusion layer with one or more separators such as but not limited to membranes, polymeric materials, diaphragm, inorganic material on its borders as described below.

In specific embodiments of the invention, the cathode area could comprise a catalyst layer able to reduce a substance (e.g., carbon monoxide) to generate value-added hydrocarbons/alcohols/organic acids. The catalyst can comprise one or more: molecular species, single-metal-site heterogeneous compounds, metal compounds, carbon-based compounds, polymer electrolytes (also referred to as ionomers), metal-organic frameworks, or metal-doped covalent organic frameworks or any other additives. The molecular species can be selected from metal porphyrins, metal phthalocyanines or metal bipyridine complexes. The metal compound can be under the form of metal nanoparticles, nanowires, nano powder, nanoarrays, nanoflakes, nanocubes, dendrites, films, layers or mesoporous structures, with precisely chosen particle sizes as to control performance. The single-metal-site compounds can comprise a metal-doped carbon-based material or a metal-N—C-based compound The cathode catalyst may be made of a metal or metal ion from metals such as, but not limited to, Cu, Ag, Au, Zn, Sn, Bi, Ni, Fe, Co, Pd, Ir, Pt, Mn, Re, Ru, La, Tb, Ce, Dy or other lanthanides and mixture and/or alloys thereof. For example, the cathodic catalyst could comprise Cu such that the electrolyzer assembly included a copper-based cathode. The polymer electrolyte can be selected out of the same materials as the one used for the described membranes. The carbon-based compounds can comprise carbon nanofibers, carbon nanotubes, carbon black, graphite, boron-doped diamond powder, diamond nanopowder, boron nitride or a combination thereof. The additives can be halide-based compounds including F, Br, I, Cl. The additives can be specifically dedicated to modify hydrophobicity such as treatment with PTFE, sulfonated tetrafluoroethylene based fluoropolymer-copolymer or another hydrophobic polymeric ionomer additive, or carbon black. The cathode may further comprise a catalyst layer on a gas diffusion layer, a porous transport layer, or any other support, which encourages the diffusion of the gas from a stream to the surface of the catalyst, as well as allowing the release of non-reacted/product gases. The cathode area could also include a gas diffusion layer with one or more separators such as, but not limited to, membranes, polymeric materials, diaphragms, and inorganic materials on its borders as described below. The loading of catalyst and additives on the gas diffusion layer can be precisely chosen to favor certain performance characteristics, such as differences in voltage, conductivity, carbon monoxide mass transport rate, product selectivity, and stability.

In specific embodiments of the inventions disclosed herein, the porous support for either the anode area, the cathode area, or both, can be selected from carbon-based porous supports or metal-based porous material or a combination. The carbon-based porous support can be based on carbon fibers, carbon cloth, carbon felt, carbon fabric, carbon paper, molded graphite laminates and the like or a mixture thereof. The carbon-based porous support can be a gas diffusion layer with or without microporous layer. Such carbon-based support can be in particular chosen in the among the following list: Sigracet 39AA, Sigracet 39BC, Sigracet 39BB, Sigracet 39BA, Sigracet 36AA, Sigracet 36BB, Sigracet 35BC, Sigracet 35BA, Sigracet 29BA, Sigracet 28BB, Sigracet 28AA, Sigracet 28BC, Sigracet 25BC, Sigracet 22BB, Sigracet 35BI, Toray papers, Toray THP-H-030, Toray TGP-H-060, Toray TGP-H-090, Toray TGP-H-120, Freudenberg H23C6, Freudenberg H15C13, Freudenberg H15C14, Freudenberg H14C10, Freudenberg H14CX483, Freudenberg H14CX653, Freudenberg H23C2, Freudenberg H23CX653, Freudenberg H24CX483, Freudenberg H23C6, Freudenberg H23C8, Freudenberg H24C5, Freudenberg H23C3, Avcarb MB-30, Avcarb GDS5130, Avcarb GDS2130, Avcarb GDS3250, Avcarb GDS3260, Avcarb GDS2230, Avcarb GDS2240, Avcarb GDS2255, Avcarb GDS2185, AvCar 1071, AvCarb 1698, AvCarbon1209, AvCarb 1185, AvCarb1186, AvCarb 7497, AvCarb T1819, AvCarb T1820, AvCarb T1824, AvCarbon 1071, AvCarb 1698, AvCarb 1209, AvCarb 1185, AvCarb 1186, AvCarb 1186, AvCarb T1819, AvCarb T1820, AvCarb T1824, AvCarb EP40, AvCarb P75, AvCarb EP55, AvCarbon EP40T, AvCarb P75T, AvCarb EP55T, AvCarb MGL190, AvCarb MGL280, AvCarbMGL370. The metal-based porous support can be selected from titanium, stainless steel, Ni, Cu or any other suitable metal and can be under the form of mesh, frit, foam or plate of any thickness or porosity.

In specific embodiments of the invention, the electrolyzer can include a separating element to separate specific generated chemicals from others. The separating element can be one or more traps on the cathodic and/or anodic outputs of the electrolyzer which separates liquid outputs from gaseous outputs. It can also be more complex systems known by those skilled in the art for the purpose of efficient product separation. The separating element can be a separating area between the anode area and the cathode area configured to separate the volume of generated chemicals from the electrolyzer. The separating area can be a separating layer. Efficient physical separation of the anode area and cathode area may allow easier separation of the gases released from each section of the reactor. The separator can be an ion-conducting polymeric separator, an ionomer solution coated onto the electrodes, a diaphragm, a ceramic-containing material, a non-charged separator scaffold, a mixed ceramic-organic compound separator, or any other separator. Separation may occur through the use of ion-exchange membranes, which favor the diffusion of either anions (in an anion-exchange membrane) or cations (in a cation-exchange membrane), or a bipolar membrane (including a mixture of cation- and anion-exchange membranes) or other types of separators, such as diaphragms, ceramic-containing materials (in particular mixed ceramic/organic compounds), or non-charged separator scaffolds. Anion-exchange membrane can comprise an organic polymer with positively charged functionality, such as, but not limited to, imidazolium, pyridinium or tertiary amines. This allows facile migration of negatively charged hydroxide ions ($OH^-$) produced during carbon monoxide reduction from the cathode to the anode. The use of this layer also prevents the crossover of other gases from the cathode to the separating layer. Cation-exchange membranes can comprise an organic polymer with negatively charged functionality such as, but not limited to, sulfonate groups. Diaphragms or non-charged separators can be materials derived from insulating materials which may be charged with an ion-conducting electrolyte to facilitate charge transfer between electrodes. Ceramic-containing materials may be a purely ceramic or mixed polymer and ceramic material. Ceramic-polymer mixes can reach higher temperatures than purely organic polymers and may take advantage of ion-exchange functionality in the polymer to pass charge between electrodes. The thickness of the membranes can be chosen precisely to control the transport rates of species such as anions, cations, and neutral species such as alcohols and water during operation.

In specific embodiments of the invention, the system can include an electrolyte that will facilitate the transportation of ions and provide ions that promote the reactions. In particular, the electrolyte may be a concentrated alkaline solution such as a solution of hydroxide-containing salt such as but not limited to potassium, sodium or cesium hydroxide with concentrations such as (0.01 molarity (M), 0.05 M, 0.1 M, 0.2 M, 0.5 M, 1 M, 2 M, 3 M, 4 M, 5 M, 6 M, 7 M, 8 M, 9 M and 10 M). The use of concentrated alkaline solution brings down the energy requirement of the overall reaction. Alkali metal cations (such as Li, Na, K, Cs, Rb) may be used as counter-cations. This electrolyte may contain oxidation substrates other than water or hydroxide, such as dihydrogen, alcohols, glycerol, other organic materials, and other oxidizable feedstocks.

In specific embodiments of the inventions disclosed herein, the flow field can comprise a ladder, single or multiple serpentines, interdigitated patterns, pillars, bio-inspired leaf-like shapes or a mixture thereof. An electrolysis cell can also include polar plates as further discussed in this disclosure. The performance of the electrolyzer can be modulated by altering the characteristics of the flow field, specifically to prevent the buildup of condensed phases that slow down the mass transport of carbon monoxide and the efflux of liquid products. For example, a larger number of flow field channels in the same area can be used to extract liquid products more efficiently from the cathode, relative to a flow field with a lower density of channels.

In specific embodiments of the inventions disclosed herein, the electrolyzer can be operated at elevated temperature and pressure to promote the stability and performance of the electrolyzer by improving carbon monoxide mass transport and product efflux. Elevated temperature can serve to evaporate liquid products present in the cathode catalyst layer, while elevated pressure can mitigate the intrusion and retention of liquids in the cathode catalyst layer. The electrolyzer can be operated under elevated pressure at both the anode and cathode compartments, or only in one compartment to precisely manage liquid and gas crossover in the electrolyzer.

In specific embodiments of the inventions disclosed herein, carbon monoxide humidification upstream of the carbon monoxide electrolyzer is a key parameter of the process chain. Depending on electrolyzer configuration, humidification of the carbon monoxide gas stream may be important for improving electrolysis efficiency. Several humidification process can be applied to a carbon monoxide stream, such as but not limited to: (1) steam injection in a gas stream; (2) membrane water/gas contact module; (3) water gas bubbler; (4) other water/gas contact systems including, but not limited to, sprayers and packed column. For solution (2), (3), (4), the gas outlet water content will mainly depend on the system operating conditions (pressure and temperature), the contact time and the exchange area between the two phases. In that case, to increase water content in the gas stream, it can be necessary to heat the inlet gas stream and/or the water put into contact with the gas. Solution (1) includes a steam generation module which can use as primary energy electricity or fuel gas in a boiler. The generated steam is then mixed with the gas stream to control relative humidity. The gas stream can be pre-heated to avoid condensation in the mixing area.

As an alternative method to humidify the carbon monoxide gas stream and to reduce energy demand of the humidifying the carbon monoxide electrolyzer, the water required to humidify the carbon monoxide gas stream can also be sourced from the water generated from the RWGS process. This also serves to reduce the energy demand of the $CO_2/H_2/CO/H_2O$ separation after the RWGS reactor, by allowing more water to be entrained in the carbon monoxide outlet stream of the separator units.

Figure 6:
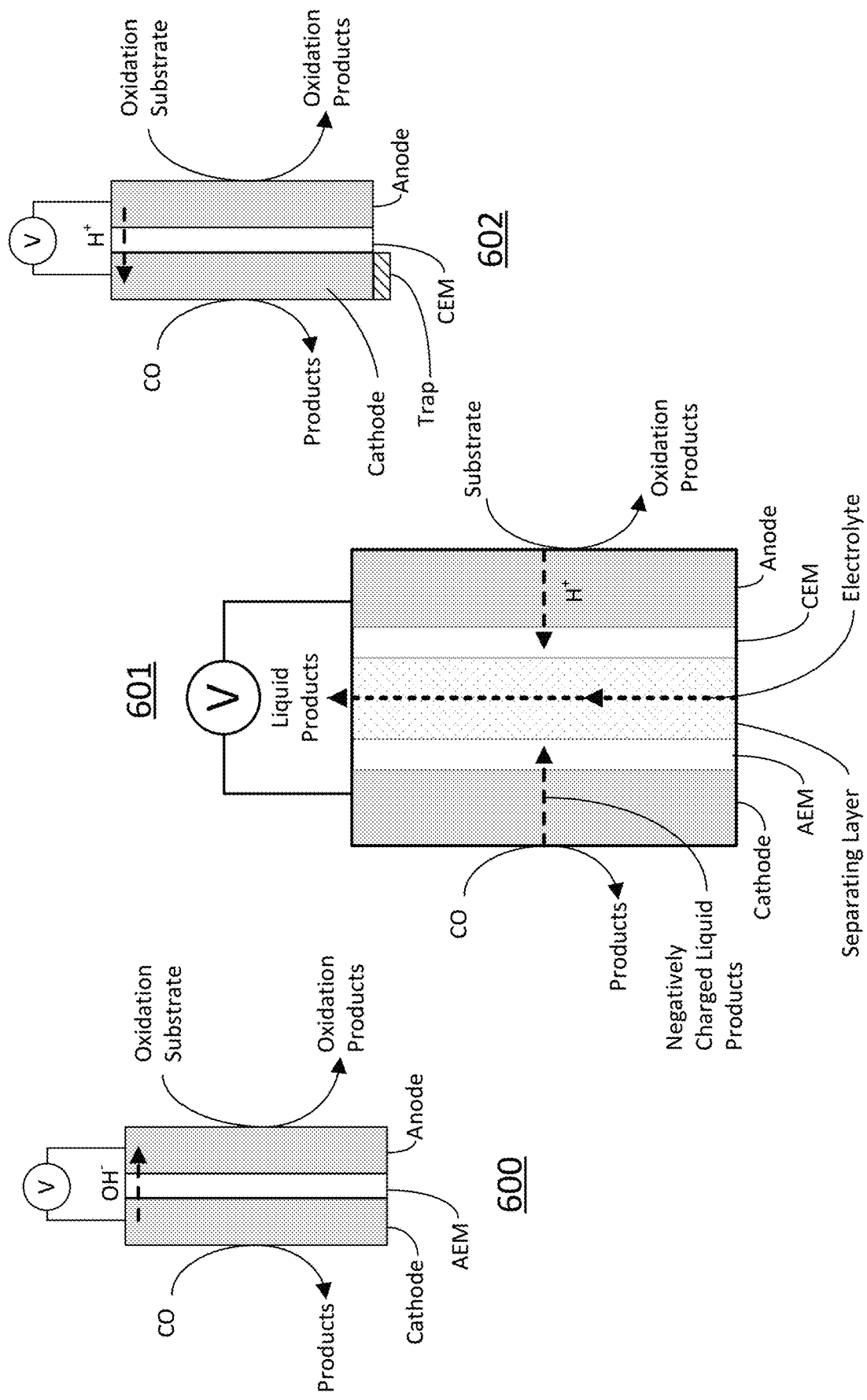
FIG. 6 illustrates a set of electrolyzer reactions that can be utilized in accordance with specific embodiments of the inventions disclosed herein.
Figure 7:
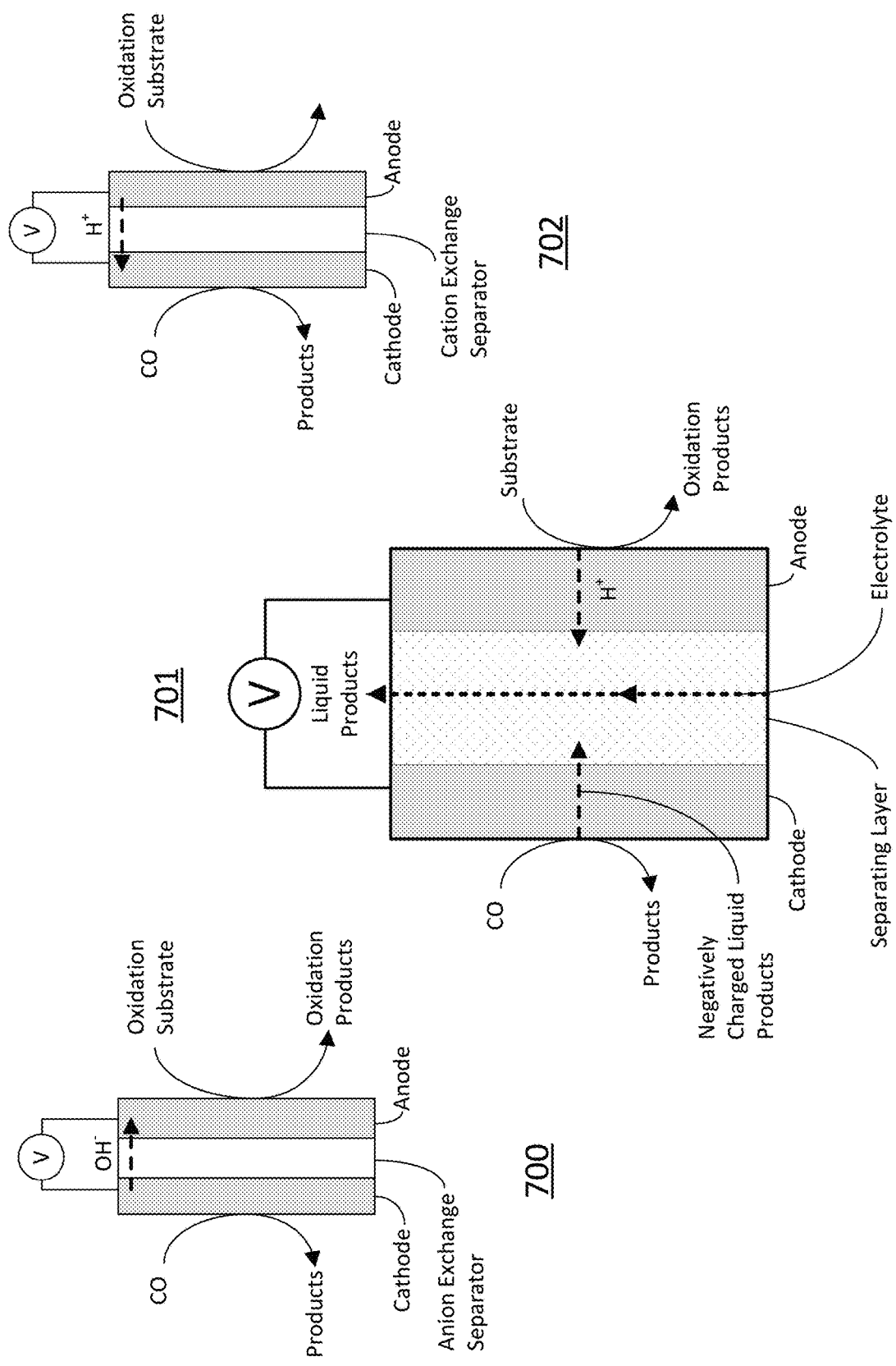
FIG. 7 illustrates a second set of electrolyzer reactions that can be utilized in accordance with specific embodiments of the inventions disclosed herein.

FIGS. 6 and 7 illustrate examples of reactions that can be conducted in accordance with the electrolyzer assemblies described herein. In the diagrams, only single cells are represented for clarity but these could easily be assembled in a plurality of cells such as in a stack. In the diagrams, a carbon monoxide electrolyzer comprises a cathode comprising a gas-diffusion layer and a copper-based catalyst, and the anode comprises a nickel material of any shape (such as but not limited to a foam, a mesh, a deposit onto a conductive porous transport layer (PTL), etc.). In this case, the carbon monoxide reduction products include one or more of the following: ethylene ($C_2H_4$), ethanol ($C_2H_5OH$), acetic acid ($CH_3COOH$), propylene ($C_3H_6$), propanol ($C_3H_8O$), oxalic acid (COOH—COOH), acrylic acid ($C_2H_3COOH$), glyoxylic acid (COH—COOH) produced according to the following carbon monoxide reduction reactions:

In Neutral/Alkaline Conditions:

$$2CO+6H_2O+8e^-\rightarrow CH_2CH_2+8OH^- \quad (11)$$

$$2CO+7H_2O+8e^-\rightarrow CH_3CH_2OH+8OH^- \quad (12)$$

$$2CO+4H_2O+4e^-\rightarrow CH_3COOH+4OH^- \quad (13)$$

$$3CO+5H_2O+6e^-\rightarrow C_2H_3COOH+6OH^- \quad (14)$$

$$3CO+9H_2O+12e^-\rightarrow C_3H_6+12OH^- \quad (15)$$

$$3CO+10H_2O+12e^-\rightarrow C_3H_8O+12OH^- \quad (16)$$

In Acidic Conditions:

$$2CO+8H^++8e^-\rightarrow CH_2CH_2+2H_2O \quad (17)$$

$$2CO+8H^++8e^-\rightarrow CH_3CH_2OH+H_2O \quad (18)$$

$$2CO+4H^++4e^-\rightarrow CH_3COOH \quad (19)$$

$$3CO+6H^++6e^-\rightarrow C_2H_3COOH+H_2O \quad (20)$$

$$3CO+12H^++12e^-\rightarrow C_3H_6+3H_2O \quad (21)$$

$$3CO+12H^++12e^-\rightarrow C_3H_8O+2H_2O \quad (22)$$

In specific embodiments, the carbon monoxide stream is mixed with other gas or liquid compounds to generate higher added value products at the cathode. In one such embodiment, imines, amines, nitrogen oxides or ammonia are added to react with carbon monoxide, or an intermediate formed during its reduction, to form amide bonds or N-rich organic compounds, such as amino acids or urea. Examples of such reactions are:

$$2CO+3H_2O+NH_3+4e^-\rightarrow CH_3CONH_2+4OH^- \text{ in neutral/alkaline conditions} \quad (23)$$

$$2CO+4H^++NH_3+4e^-\rightarrow CH_3CONH_2+H_2O \text{ in acidic conditions} \quad (24)$$

In specific embodiments, the oxidation reaction at the anode is selected from the group consisting of reactions undertaken in an acidic environment and reactions undertaken in an alkaline environment such as but not limited to anodic reactions in an acidic environment such as:

$$2H_2O\rightarrow O_2+4H^++4e^- \quad (25)$$

$$H_2\rightarrow 2H^++2e^- \quad (26)$$

$$Cl^-\rightarrow Cl_2+2e^- \quad (27)$$

$$Br^-\rightarrow Br_2+2e^- \quad (28)$$

$$I^-\rightarrow I_2+2e^- \quad (29)$$

$$C_3H_8O_3(\text{glycerol})\rightarrow C_3H_6O_3(\text{glyceraldehyde})+2H^++2e^- \quad (30)$$

$$C_3H_8O_3(\text{glycerol})+H_2O\rightarrow C_3H_5O_4^-(\text{glycerate})+5H^++4e^- \quad (31)$$

$$C_3H_8O_3(\text{glycerol})+3/2H_2O\rightarrow 3/2C_2H_3O_3^-+13/2H^++5e^- \quad (32)$$

$$C_3H_8O_3(\text{glycerol})+3H_2O\rightarrow 3HCOO^-(\text{formate})+11H^++8e^- \quad (33)$$

$$C_3H_8O_3(\text{glycerol})+3H_2O\rightarrow 3/2C_2O_4^{2-}+14H^++11e^- \quad (34)$$

and anodic reactions in neutral/alkaline environments such as:

$$4OH^-\rightarrow O_2+2H_2O+4e^- \quad (35)$$

$$H_2+2OH^-\rightarrow 2H_2O+2e^- \quad (36)$$

$$Cl^-\rightarrow Cl_2+2e^- \quad (37)$$

$$Br^-\rightarrow Br_2+2e^- \quad (38)$$

$$I^-\rightarrow I_2+2e^- \quad (39)$$

$$C_3H_8O_3(\text{glycerol})+2OH^-\rightarrow C_3HO_3(\text{glyceraldehyde})+2H_2O+2e^- \quad (40)$$

$$C_3H_8O_3(\text{glycerol})+5OH^-\rightarrow C_3H_5O_4(\text{glycerate})+4H_2O+4e^- \quad (41)$$

$$C_3H_8O_3(\text{glycerol})+13/2OH^-\to 3/2C_2H_3O_3^-+5H_2O+5e^- \quad (42)$$

$$C_3H_8O_3(\text{glycerol})+11OH^-\to 3HCOO^-(\text{formate})+8H_2O+8e^- \quad (43)$$

$$C_3H_8O_3(\text{glycerol})+14OH^-\to 3/2C_2O_4^{2-}+11H_2O+11e^- \quad (44)$$

$$C_2H_5OH+5OH^-\to CH_3COO^-+4H_2O+4e^- \quad (45)$$

$$C_3H_7OH+5OH^-\to CH_3CH_2COO^-+4H_2O+4e^- \quad (46)$$

In specific embodiments of the invention, the carbon monoxide electrolyzer includes one or more ion exchange membranes chosen among anion-exchange membranes (such as, but not limited to, commercial Ionomr®, Orion®, Sustainion®, Piperion®, ionomer anion-exchange membranes), proton-exchange membranes (such as but not limited to Nafion®, Aquivion® or commercial membranes), bipolar membranes (such as, but not limited to, Fumasep® FBM and Xion®). In specific embodiments of the invention, the membrane in an anion-exchange membrane is prepared using N-bearing monomers. In the example of reactor 600, the electrolyzer includes an anion exchange membrane and hydroxide moves from the cathode to the anode. The oxidation product depends on the oxidation substrate, while the product harvested from the cathode output can be any of the generated chemicals mentioned above. In the example of reactor 602, the electrolyzer includes a cation exchange membrane and protons move from the anode to the cathode. The oxidation product again depends on the oxidation substrate, while the product harvested from the cathode output can be any of the generated chemicals mentioned above.

In specific embodiments of the invention, the electrolyzer can include a separating layer. In the example of reactor 601, the carbon monoxide electrolyzer comprises a central separating layer in which an electrolyte fluid is circulated allowing the collection of liquid carbon-monoxide-reduction products that migrate from the cathode toward the central separating layer. In specific embodiments, the central separating layer is either separated from the cathode by an anion-exchange membrane or from the anode by a cation-exchange membrane, or both membranes are present. In the example of reactor 601, both membranes are present. In this example, useful products can be harvested both from the liquid stream from the separating layer and a gaseous stream from the cathode output. For example, the carbon monoxide could be used by the electrolyzer to produce one or more of the following: ethylene ($C_2H_4$), ethanol ($C_2H_5OH$), acetic acid ($CH_3COOH$), propylene ($C_3H_6$), propanol ($C_3H_8O$). In a specific embodiment, the main targeted product is ethylene (in the gaseous product stream). In another specific embodiment, the main targeted products are ethylene (in the gaseous product stream) and ethanol (in the liquid product stream). In another specific embodiment, the main targeted products are ethylene (in the gaseous product stream) and acetic acid/acetate (in the liquid product stream). For example, in reactor 602, a trap is located at the cathodic output which separates liquid products from gaseous products such that they can both be collected. In these examples, the oxidation occurring at the anode could be water/hydroxide oxidation, dihydrogen oxidation, or chloride oxidation. Notably, in a physical system the trap is located on the connection to the outlet of the cathode such as to piping that is connected to the cathode, and the trap is drawn connected to the cathode area for diagrammatic purposes only.

The examples illustrated in FIG. 7 are similar to those of FIG. 6 in terms of the overall theory of the reactor. However, the approaches in FIG. 7 operate without the use of exchange membranes and instead operate with separating layers that achieve similar effects. Reactor 700 is similar to that of reactor 600 in that hydroxide ions move from the cathode to the anode and generated products can be harvested from the cathode output. Reactor 701 is similar to that of reactor 601 in that the separating layer includes a liquid electrolyte and useful products can be harvested both from the output of the separating layer in liquid form and from an output of the cathode area in fluid form. Reactor 702 is similar to reactor 602 in that protons migrate across the separating layer and useful products can be harvested from the output of the cathode.

Figure 8:
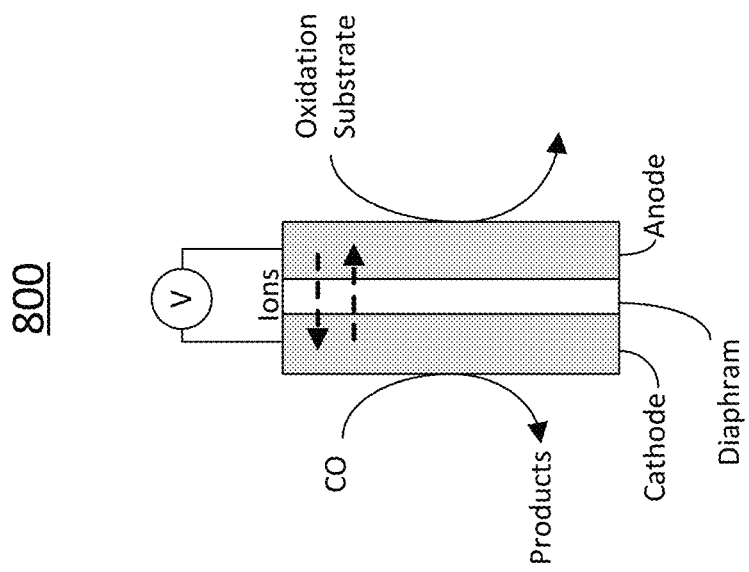
FIG. 8 illustrates an electrolyzer using a diaphragm as a separating element in accordance with specific embodiments of the inventions disclosed herein.

In specific embodiments of the invention, a porous diaphragm can be used in the electrolyzer as a separation element to achieve separation. The diaphragm can be saturated with an electrolyte which allows ions to cross between the cathode and anode. FIG. 8 shows reactor 800 in which the separation element is a diaphragm that allows ions to cross from the anode to the cathode and/or ions to cross from the cathode to the anode.

In specific embodiments of the invention, a carbon monoxide stream is mixed with at least one other chemical such as other gas or liquid compounds to generate higher added value products at the cathode of an electrolyzer. The carbon monoxide stream can be mixed with such additive chemicals at the time the carbon monoxide is supplied to the electrolyzer. In one such embodiment, imines, amines, nitrogen oxides, or ammonia are added to react with carbon monoxide, or an intermediate formed during its reduction, to form amide bonds or nitrogen rich organic compounds, such as amino acids. In another embodiment, aromatic or aliphatic acids/aldehydes/alcohols are added to react with the carbon monoxide, or an intermediate formed during its reduction, to form hydrocarbons, alcohols or organic acids. In another embodiment, aromatic or aliphatic olefins or hydrocarbons are added to react with the carbon monoxide, or an intermediate formed during its reduction, to form hydrocarbons, alcohols or organic acids. These reactions can be combined with any of the reactors mentioned above. For example, the oxidation occurring at the anode can be water oxidation, hydroxide oxidation, dihydrogen oxidation, or halide oxidation.

Figure 9:
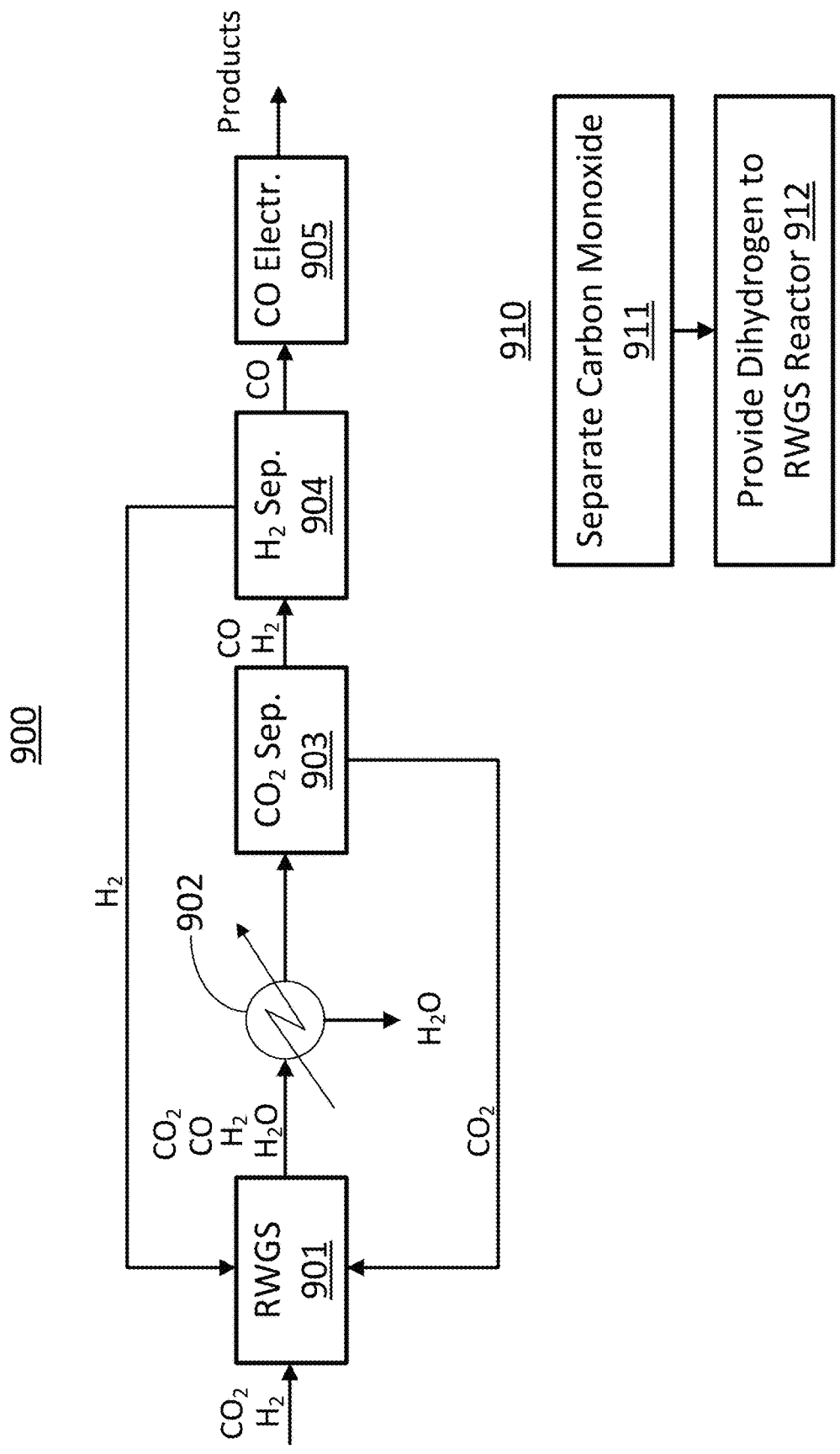
FIG. 9 illustrates a block diagram of a tandem carbon dioxide valorization reactor having feedback paths for carbon dioxide and dihydrogen in accordance with specific embodiments of the inventions disclosed herein.
Figure 10:
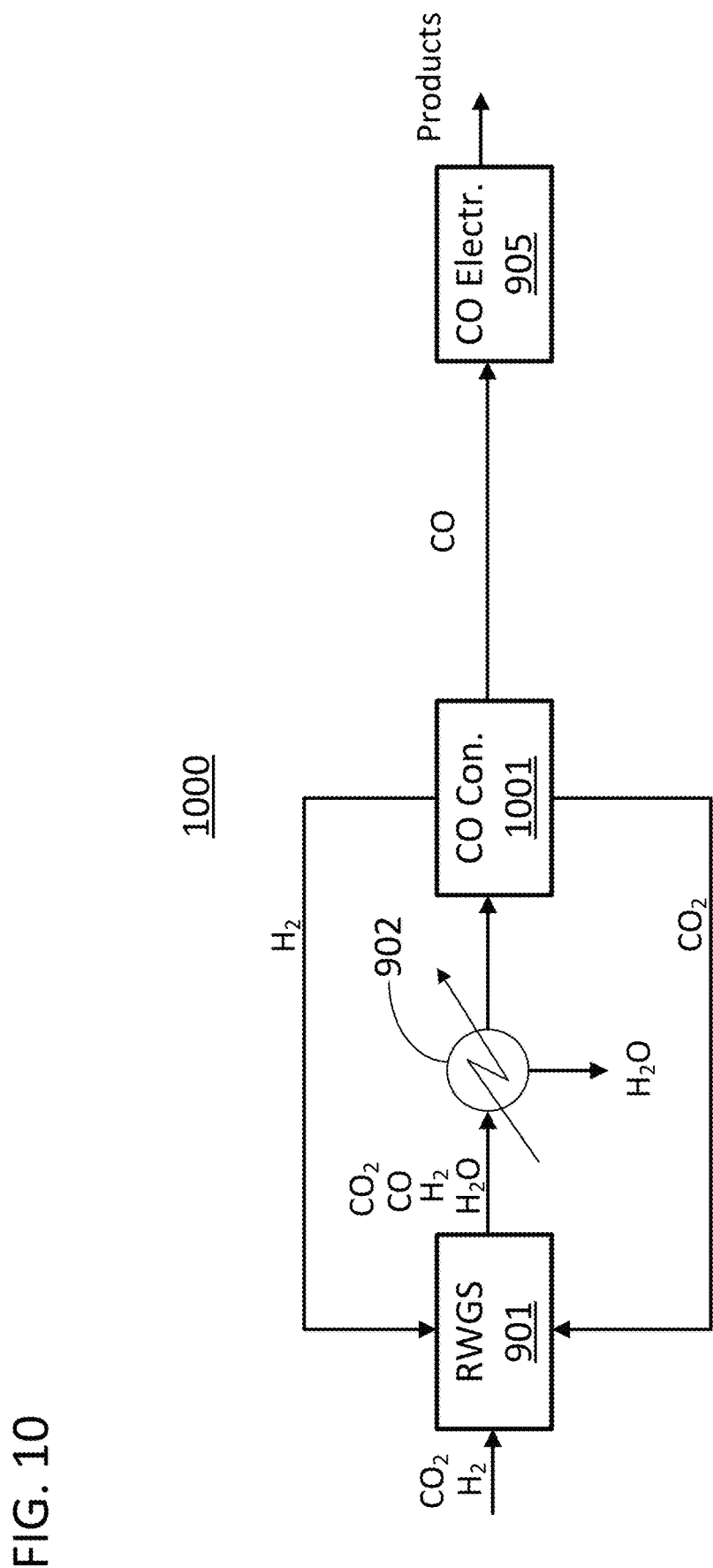
FIG. 10 illustrates a block diagram of a tandem carbon dioxide valorization reactor having a carbon monoxide concentrator in accordance with specific embodiments of the inventions disclosed herein.
Figure 11:
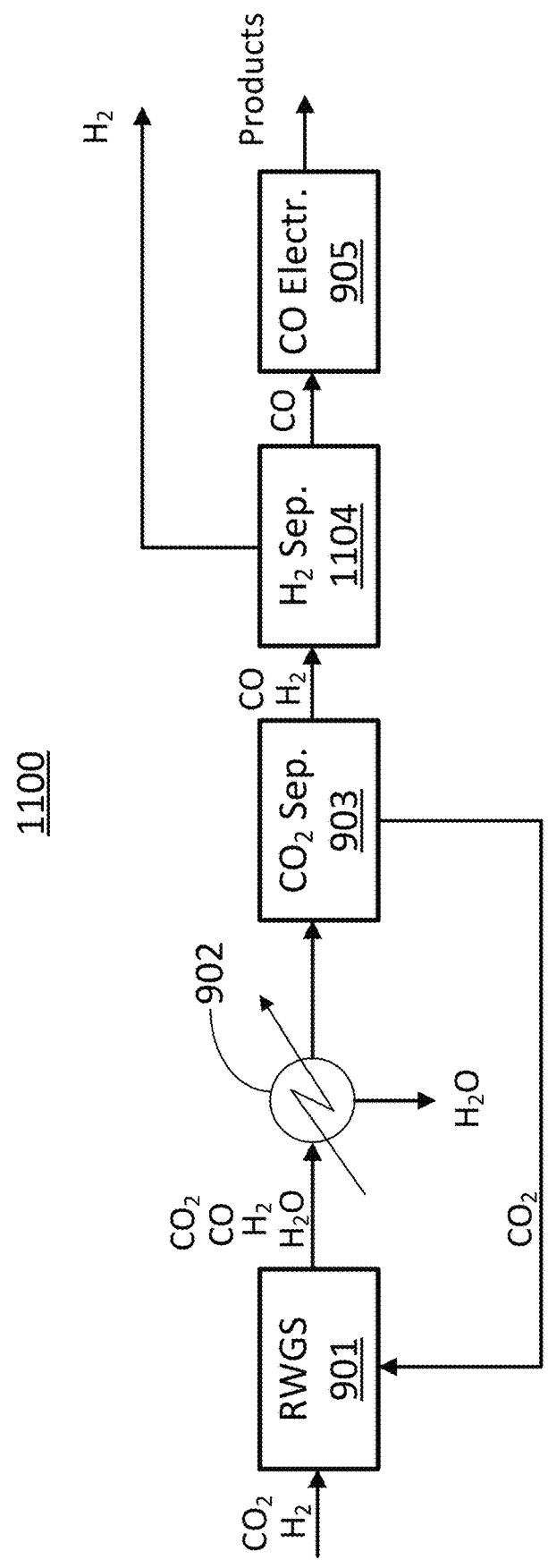
FIG. 11 illustrates a block diagram of a tandem carbon dioxide valorization reactor which generates dihydrogen along with another valuable chemical product in accordance with specific embodiments of the inventions disclosed herein.
Figure 12:
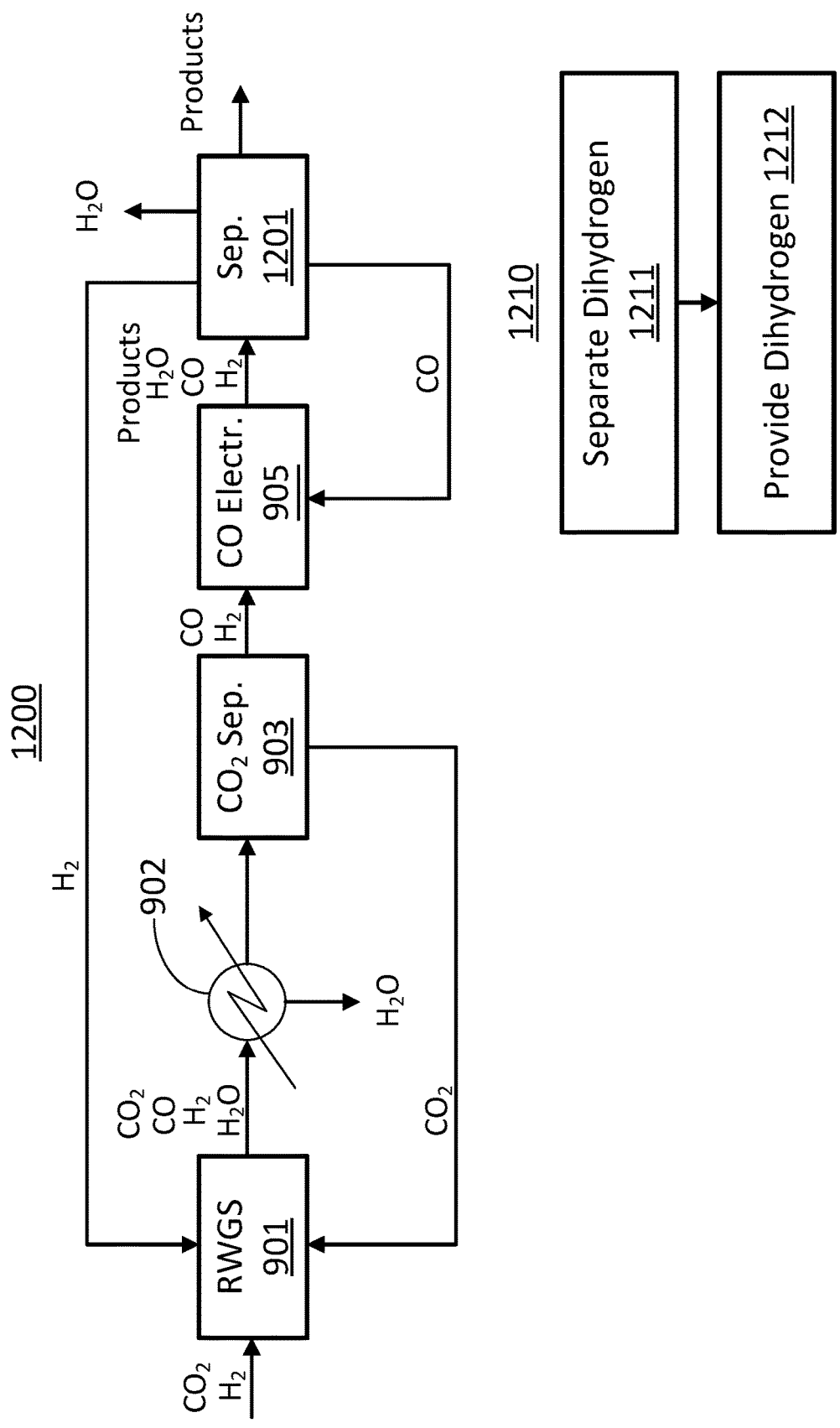
FIG. 12 illustrates a block diagram of a tandem carbon dioxide valorization reactor having a feedback path for carbon monoxide to the electrolyzer and a feedback path for dihydrogen to the RWGS reactor in accordance with specific embodiments of the inventions disclosed herein.
Figure 13:
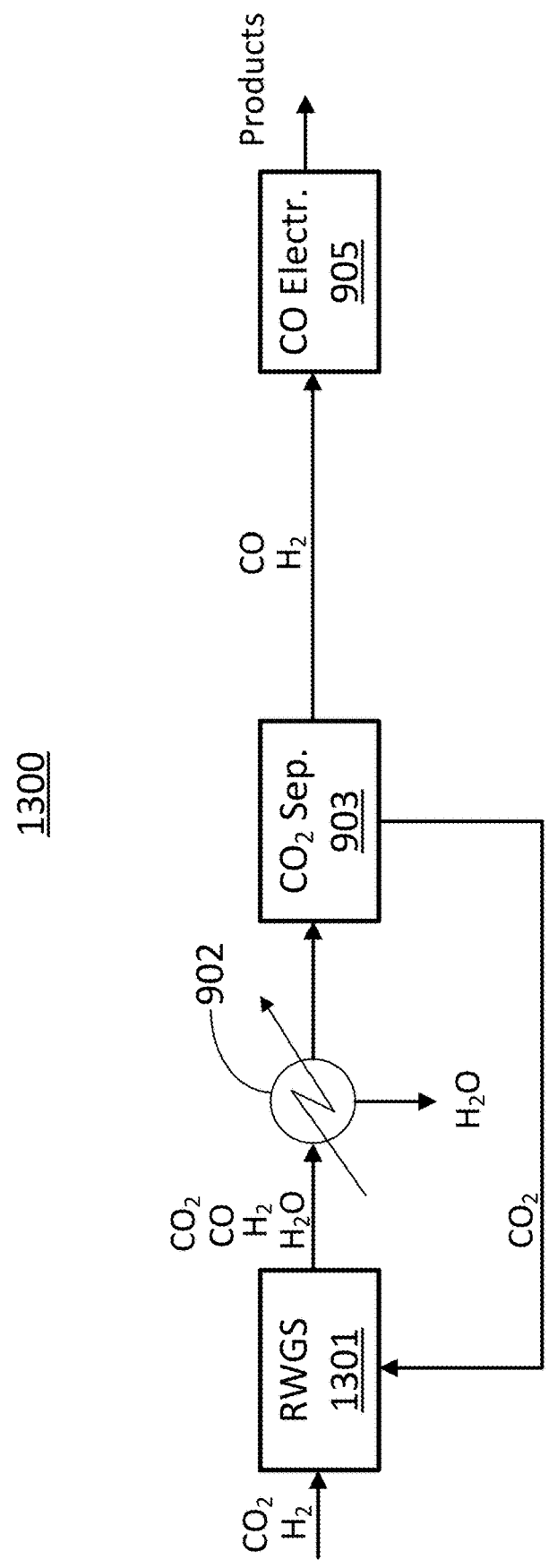
FIG. 13 illustrates a block diagram of a tandem carbon dioxide valorization reactor that does not use a dihydrogen separator in accordance with specific embodiments of the inventions disclosed herein.
Figure 14:
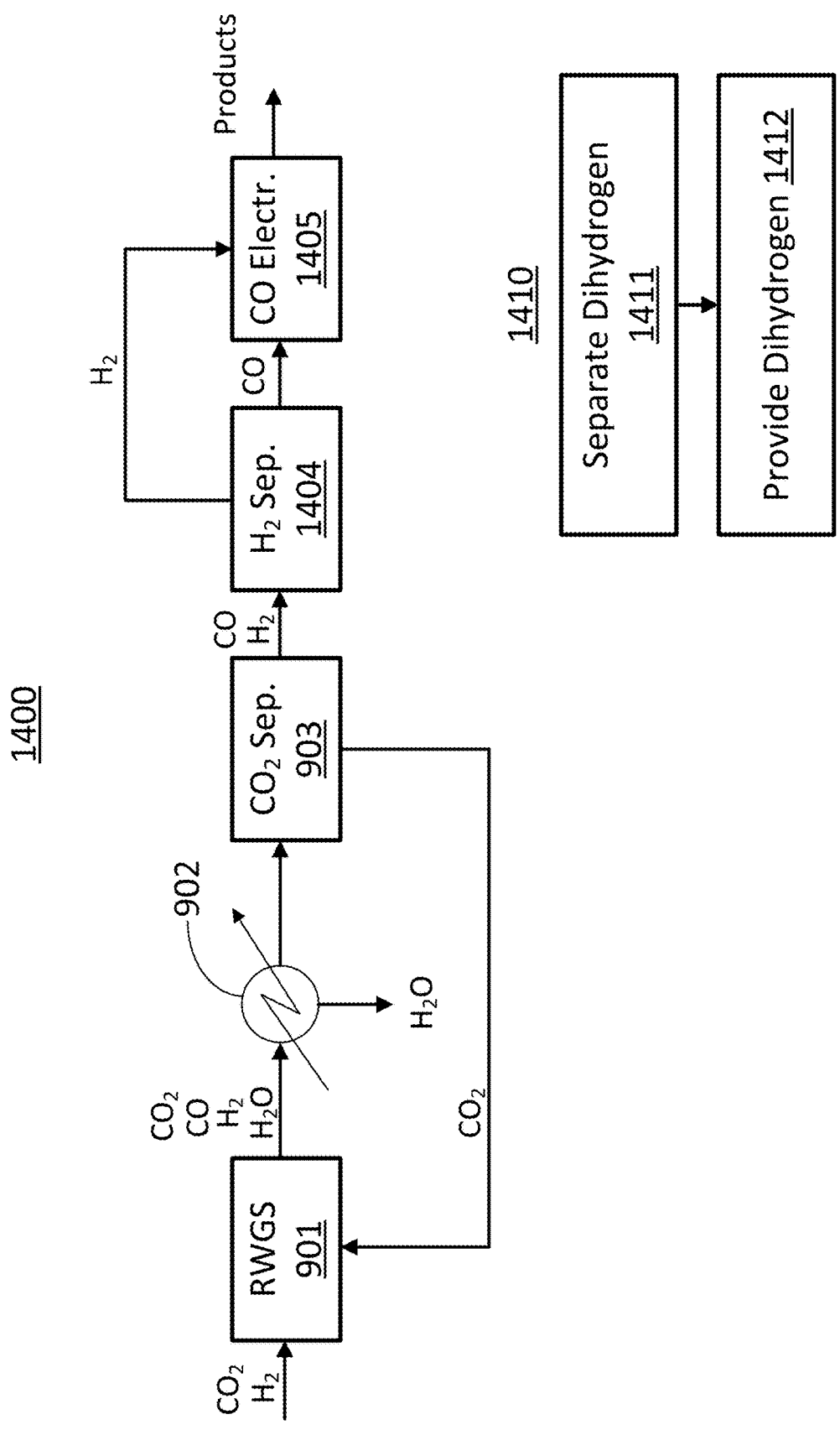
FIG. 14 illustrates a block diagram of a tandem carbon dioxide valorization reactor that supplies dihydrogen from the RWGS reactor to the anode of an electrolyzer in accordance with specific embodiments of the inventions disclosed herein.

FIGS. 9-15 provide examples of tandem reactor architectures which include a RWGS reactor and an electrolyzer in series along with various separation units in order to produce valuable products from carbon dioxide. FIG. 9 illustrates a block diagram 900 of a tandem carbon dioxide valorization reactor having feedback paths for carbon dioxide and dihydrogen in accordance with specific embodiments of the invention disclosed herein. FIG. 10 illustrates a block diagram 1000 of a tandem carbon dioxide valorization reactor having a carbon monoxide concentrator in accordance with specific embodiments of the invention disclosed herein. FIG. 11 illustrates a block diagram 1100 of a tandem carbon dioxide valorization reactor producing a low dihydrogen output such that a dihydrogen separator is not used between the RWGS reactor and the carbon monoxide electrolyzer. FIG. 12 illustrates a block diagram 1200 of a tandem carbon dioxide valorization reactor which produces dihydrogen as an output in addition to the useful products produced by the carbon monoxide electrolyzer. FIG. 13 illustrates a block diagram 1300 of a tandem carbon dioxide valorization reactor with the outlet stream of the RWGS process scrubbed of only carbon dioxide and not dihydrogen. The mixture of carbon monoxide, dihydrogen, and water is then fed into the carbon monoxide electrolyzer in accordance with specific embodiments of the inventions disclosed herein. FIG. 14 illustrates a block diagram 1400 of a tandem carbon dioxide valorization reactor where the dihydrogen from the output of the RWGS reactor is supplied to the anode of the electrolyzer to be used as the oxidation substrate of the electrolyzer. FIG. 15 illustrates a block diagram 1500 of a tandem carbon dioxide valorization reactor where all the dihydrogen required by the RWGS reactor is sourced from the electrolyzer in the tandem reactor and no external source of dihydrogen is required.

The tandem reactor architectures disclosed herein can be designed to operate continuously with carbon monoxide being produced by the RWGS reactor in time to supply the carbon monoxide electrolyzer. The tandem reactor architectures disclosed herein can be designed to produce an output from the RWGS reactor with a ratio of carbon monoxide to dihydrogen that is tuned for the characteristics of the downstream carbon monoxide electrolyzer or that can be changed based on the state of the downstream portion of the overall production line. The control system for the tandem reactor could include safeguards to shut down the reactor, or portions thereof, upon detecting the presence or absences of certain chemicals in the reactor (e.g., shut down the electrolyzer to save power if not enough carbon monoxide is being produced by the RWGS reactor).

In specific embodiments of the inventions disclosed herein, one or more separators can be located on the fluid connections between the reactor components. The separators can be designed to separate out specific chemicals from a fluid stream in the fluid connection. For example, a volume of carbon monoxide can be separated from a volume of carbon dioxide at an output of a RWGS reactor using at least one separator unit as in step 911 of flow chart 910 in which carbon dioxide separator 903 separates out carbon dioxide from the output of a RWGS reactor. The at least one separator in this example can be an acid scrubber and the electrolyzer can use an alkaline electrolyte.

In specific embodiments of the invention, the carbon monoxide can be separated from trace chemicals left over in the output of the RWGS reactor and the water output by the RWGS reactor. The carbon monoxide can be separated using various approaches such as separating with membranes, cryogenic separating, separating methods based on variant physical or chemical properties of the components of the output of the RWGS reactor, separation based on pressure-swing adsorption, temperature-swing adsorption, vacuum- or vacuum-pressure swing adsorption, or separation based on absorption. For example, a separating system can be used on the output of the RWGS reactor to first cool the output to remove impurities and then heat the output fluid to allow purified dihydrogen to evaporate through a membrane that filters out carbon monoxide. Any carbon dioxide or dihydrogen filtered out of the output of the RWGS reactor can be fed back to serve a feedstock to the RWGS reactor. Any parasitic dihydrogen or carbon monoxide filtered out of the output of the electrolyzer can be fed back to serve as a feedstock to the RWGS reactor. Any carbon monoxide filtered out of the output of the electrolyzer can be fed back to serve as a feedstock to the electrolyzer. Alternatively, any dihydrogen filtered out of the output of the RWGS reactor of the electrolyzer can be removed from the system as a useful product along with the chemicals generated by the electrolyzer.

The carbon monoxide gas mixture to be purified and fed into to the carbon monoxide electrolyzer, depending on the production process, can be water saturated with relative humidity as high as 80%-100% at the considered pressure and temperature. To avoid water condensation in pipes, gas compressors, and process units, water can be fully or partially removed until a defined temperature dew point. Pipes and process units can be insulated or heat traced (electrically or through sealed envelope). Several processes to remove water can be used such as but not limited to: (1) heat exchanger using cool refrigerant to condense water; (2) physical absorption unit using physical solvents such as, but not limited to, methanol, glycol (Mono ethylene glycol (MEG), diethylene glycol (DEG), triethylene glycol (TEG), tetraethylene glycol (TREG)); (3) membrane based processes which are selective for water removal; (4) adsorption filter using sorbent such as, but not limited to, activated alumina, zeolite (3A, 4A), and silica gel. Solution (1) cannot reduce the gas water dew point below 0-5° C. Solution (2), (3) and (4) can reduce the gas water dew point between −10° C. and −50° C. meaning less than 10 ppm of water.

The systems utilized to conduct the separating steps and processes above can take on various forms. The separation system may conduct one or more of multiple separation/purification steps including any technology available for the targeted purification/separation. The separation system can include separation units based on but not limited to membrane technologies including but not limited to dense polymeric membranes, ultrafiltration and nano-filtration membranes, facilitated-transport membranes, metallic membranes, hollow fiber pervaporation membranes, cryogenic technologies, adsorption technologies including but not limited to physisorption and chemisorption technologies, absorption technologies, including physical absorption technologies and chemical absorption technologies, with operation techniques such as but not limited to vacuum pressure swing, temperature swing, pressure swing, arid pressure swing, coupled pressure and temperature swing, and electric swing. Chemical adsorbents that can be used include but are not limited to amine-based adsorbents (amine grafted or impregnated solids), metal oxides, metal salts, double salts and hydrotalcites. Physical adsorbents that can be used include but are not limited to materials such as carbon-based materials, mesoporous silica, zeolites, zeolitic imidazolate frameworks (ZIF's), metalorganic frameworks (MOF's), and blended adsorbents.

The removal of carbon dioxide or other acid gases from a gas mixture using the techniques detailed above will need to bring carbon dioxide concentrations below a certain desired threshold, depending on process conditions. This acid gas removal process may require a combination of techniques, or multiple stages of separator units in order to more thoroughly scrub acid gases from the gas mixture. For example, to reduce carbon dioxide concentrations down to less than 1% in a carbon-monoxide-rich gas stream leaving a carbon-monoxide– producing process, one or more pressure swing adsorption subunits, absorption subunits, or membrane separation subunits may be combined in series or parallel to ensure a high degree of acid gas removal, depending on process conditions required.

Hydrogen sulfide is a common contaminant from RWGS stream gases. Hydrogen sulfide can be removed from a gas stream using a variety of specific sorbents set in a fixed bed layer, through which the gas stream is flowed through before further downstream processing. Most commonly, activated carbon impregnated with specific species such as, but not limited to, potassium iodide, potassium permanganate, and metal oxides (such as but not limited to CuO, FeO, MgO) are used. The impregnation of these specific species promotes hydrogen sulfide oxidation into elemental sulfur, which accumulate on the sorbent surface. Adsorption capacities can be as high as 80-100 w/w %. Once the filter is saturated, the sorbent must be replaced. Other processes as chemical absorption can also be implemented to remove hydrogen sulfide.

Chemical absorption technologies to remove acid gas (e.g., carbon dioxide and hydrogen sulfide) from the RWGS stream can include those that use methods relying on reversible complexation with a soluble metal complex, or alkaline and/or amine-bearing solutions that use the chemical action of base equivalents to capture acid gases. Most commonly, chemical and physical absorption process units separating carbon dioxide from a gas stream are composed by two main equipment: (1) the absorption tower; and (2) the regeneration tower. In the absorption tower, the inlet gas is fed at the bottom while the liquid is fed at the top at counter current. The column internals include, but are not limited to, structured packing, random packing, trays, gas and liquid distributors, and liquid sprayers which aim to maximize the exchange area between the liquid and the gas phases. The absorption column can be operated at 10-80° C. and at 1-80 bars according to the used solvent. The loaded solvent exits the absorption tower by the bottom, and is then pumped and pre-heated before entering the regeneration tower. A regeneration tower can be a stripping column or distillation column which include a reboiler and a condenser. The absorbed carbon dioxide is released at the column top by the effect of the temperature increase and/or of the pressure decrease. The regeneration tower is operated at 80-150° C. and 1-10 bars. Lean solvent is then pumped and cooled before entering the absorption column completing the loop. Chemical based solvent can be, but are not limited to methylethanolamine (MEA), dimethylethanolamine (DEA), methyldiethanol amine (MDEA), piperazine (PZ), soda (NaOH), KOH, and a solvent blend. Physical solvent can be dimethyl ether (DME), methanol, or a solvent blend.

Swing adsorption techniques can be used to physically or chemically adsorb a species in a fluid line in order to separate it from other gases. Such techniques use an adsorbent selective for one or more of the molecules in a fluid line, and achieve separation through the following steps: the first is the adsorption of the one species, while all other species pass through the adsorbent; and the second is a regeneration, wherein an increase in temperature or/and a decrease in pressure is used to extract the adsorbed species from the adsorbent material. Several swing adsorption separators, usually between two and ten, may be operated in parallel to allow continuous separation to occur and to minimize the specific power consumption. The adsorbent material can operate via a chemical or physical mechanism. Chemical adsorbents that can be used include but are not limited to amine-based adsorbents (amine grafted or impregnated solids), metal oxides, metal salts, double salts and hydrotalcites. Physical adsorbents that can be used include but are not limited to materials such as activated carbons, carbon molecular sieves, mesoporous silica, zeolites, zeolitic imidazolate frameworks (ZIF's), metal organic frameworks (MOF's), or blended adsorbents. Swing adsorption processes can be applied to, but not limited to, carbon dioxide removal, oxygen removal, carbon monoxide and dihydrogen separation, nitrogen removal, volatile organic chemical removal, methane and carbon monoxide separation, gas drying and a mix of the previous applications according to the sorbent material nature, number of different sorbent layers and the operating conditions.

Membrane separation uses an extended surface comprising a polymeric species for the movement/restriction of a particular species in a fluid line. The separator may comprise several layers of the membrane surface to achieve effective separation. At commercial scale, the membrane can be arranged, but not limited to, in a hollow fiber module, or in a spiral wound module. The separation is achieved through a favorable chemical interaction of the membrane with the substance to be removed from the fluid line or through a size of pore tailored for the exclusion of larger molecules within the fluid. The different gas species either end on the permeate side meaning they have gone through the membrane layers leading to pressure drops or in the retentate side. The separation driving force can be the pressure gradient or/and the concentration gradient between the permeate and the retentate side. These processes may require several independent stages of compressor and membrane units to achieve full purification of the fluid line and to reach the largest recovery rate of the desired species. Membrane separation can be applied to, but not limited to, carbon dioxide removal, oxygen removal, nitrogen removal, dihydrogen and carbon monoxide separation, olefin removal, gas drying and a mix of the previous applications according to the membrane material, the number of membrane stages and the operating conditions.

Downstream of the RWGS reactor and the separation/purification units, CO-rich gas can be compressed prior to introduction into the electrolyzer. Compressor technologies can be, but are not limited to, centrifugal or volumetric. Volumetric technologies include, but are not limited to, membrane compressor, screw compressor and reciprocating compressor. The technology choice will depend on the gas flowrate and on the required outlet pressure. Knowing that the maximum compression ratio through a compressor is commonly taken at 3, between 1 and 5 compression stages may be needed to reach the require pressure. Inter-stage cooling steps are then necessary.

While the system shown in FIG. 9 includes two separation systems and a single electrolyzer, many different variations are possible. For example, a single, or multiple separating systems can be connected in series to separate out chemicals such as carbon dioxide from reaching the input of the electrolyzer. The separating can be conducted to ever increasing levels of purity and one or more of the multiple separating systems can be coupled to a single electrolyzer for the delivery of carbon monoxide. As another example, multiple such separating systems can be coupled with a set of electrolyzers that are configured to accept cathodic inputs with different levels of carbon monoxide volume or concentration.

The tandem reactor in block diagram 900 includes RWGS reactor 901 and three separators in sequence that remove water, carbon dioxide, and dihydrogen in series. In the illustrated case, separator 902 separates out the water produced by RWGS reactor 901, carbon dioxide separator 903 separates out trace carbon dioxide from the output of RWGS reactor 901, and dihydrogen separator 904 conducts a step 911 from flow chart 910 of separating the volume of carbon monoxide and a volume of dihydrogen from an output volume of the RWGS reactor 901. Separator 902 works by cooling the gas and evacuating the formed condensate. The dihydrogen separator and carbon dioxide separator units can utilize, but are not limited to, swing adsorption processes, absorption processes, membrane-based processes or cryogenic processes. The dihydrogen separator unit and the carbon dioxide removal unit can be in any order. As illustrated, flow chart 910 continues with a step 912 of providing the volume of dihydrogen from the at least one separator unit (i.e., dihydrogen separator 904) to the RWGS reactor 901 as a feedstock. The water in this example is discarded for other uses in the illustrated approach, but in other approaches it could be used as a feedstock to carbon monoxide electrolyzer 905 and does not need to be separated from the carbon monoxide. The carbon dioxide in this example is also fed back to be used as a feedstock to RWGS reactor 901. Carbon dioxide separator 903 therefore provides the dual role of avoiding contamination in the carbon monoxide electrolyzer, but also assuring the no carbon dioxide is emitted by the system.

FIG. 10 includes block diagram 1000. In block diagram 1000, a gas mixture containing dihydrogen and carbon dioxide is fed to a RWGS reactor 901. The resulting gas mixture contains dihydrogen, carbon monoxide, carbon dioxide, and water. The main part of water vapor is removed by cooling the gas and evacuating the formed condensate in a separator 902. Carbon monoxide is then extracted from the other gas by a dedicated unit. This unit can be, but is not limited to, an absorption unit using liquid solvent (e.g., CO-SORB process reactor 1001) or a PSA (Pressure Swing Adsorption Unit) (e.g., CO-PSA) using specific sorbent material (e.g., impregnated with copper species for example). The separating stream containing carbon dioxide and dihydrogen is recirculated upstream to the RWGS reactor. The purified carbon monoxide is then sent to an electrolyzer (e.g., carbon monoxide electrolyzer 905) to produce any valuable product, such as among others, ethylene, ethanol or acetic acid. This kind of process can be oriented to get high carbon monoxide purity for the downstream electrolyzer. A small portion of carbon monoxide will be recirculated to the RWGS reactor with the concentrated dihydrogen and carbon dioxide stream.

FIG. 11 illustrates a block diagram 1100 with similar components to that of block diagram 900. However, in block diagram 1100, dihydrogen coming from the dihydrogen separation unit 1104 is not fed back to the RWGS reactor 901 but is instead directly valorized/sold as pure in another process. The process conducted by a tandem reactor in accordance with block diagram 1100 would exhibit significant benefits in that it could produce both dihydrogen and useful products such as ethylene at the same time.

The approaches of FIG. 11 and FIG. 9 could be combined in a single embodiment such that a single reactor could alternatively directly valorize or recirculate the dihydrogen separate from the output of the RWGS reactor. These approaches are advantageous in embodiments where the input and output mass flux of the RWGS process chain and carbon monoxide electrolyzer are not commensurate, allowing for continuous operation and minimizing process bottlenecks. In specific embodiments, separate valorization of the dihydrogen from the RWGS allows for the proportion of dihydrogen recirculated relative to the dihydrogen externally valorized to match with the carbon monoxide electrolyzer capacity. Furthermore, in such embodiments, a single production line can produce both dihydrogen and useful chemicals (e.g., ethylene) from an electricity source and a carbon dioxide source with a net ratio controlled by the recirculation rate of the dihydrogen downstream of the RWGS reactor (e.g., after dihydrogen separation unit 1104, downstream of the RWGS reactor 901, and before the carbon monoxide electrolyzer 905).

FIG. 12 illustrates a block diagram 1200 with similar components to that of block diagram 900. However, in block diagram 1200 a separator unit 1201 at the output of the carbon monoxide electrolyzer 905 separates out carbon monoxide and feeds it back as a feedstock for carbon monoxide electrolyzer 905 and also separates out water and dihydrogen to leave behind the useful products produced by the carbon monoxide electrolyzer. The useful products can be in liquid form and can be separated from the dihydrogen and monoxide due to the difference in phase between the gases and the liquid. The water can be separated using a process similar to that described with reference to separator 902 above. The separator unit 1201 can be any of swing adsorption processes, absorption processes, membrane-based processes, cryogenic processes, or liquid/gas separation vessels. The useful products can be any of those described throughout this disclosure.

FIG. 12 also includes a flow chart 1210 which includes a step 1211 of separating out dihydrogen from the output of a carbon monoxide electrolyzer (e.g., carbon monoxide electrolyzer 905) and a step 1212 of providing a volume of dihydrogen from the anode area of the electrolyzer to the RWGS reactor as a feedstock. This dihydrogen is formed during carbon monoxide electrolysis as a result of reducing water and/or protons and is mixed with the outlet gas stream of the carbon monoxide electrolyzer. At the outlet of a carbon monoxide electrolyzer, a gas stream consisting of unconverted carbon monoxide, undesired dihydrogen, ethylene gas, and/or other hydrocarbons is produced. In specific embodiments of the invention, because the dihydrogen content in the gas stream is fractional, it can be uneconomical to invest in the downstream infrastructure required to condition the undesired dihydrogen for further processing or sale so this approach, in which the dihydrogen is still utilized, provides significant benefits. The oxidation substrate in carbon monoxide electrolyzer 905 can be one of water and dihydrogen.

FIG. 13 includes a block diagram 1300 with elements that are similar to those of block diagram 900 except there is no separator to separate out the carbon monoxide from the dihydrogen produced by the RWGS reactor. In specific embodiments of the invention, this approach is beneficial in that there is no capital expenditure for such a separator and no energy requirement associated with operating such a separator. In these embodiments, a RWGS reactor 1301 can be configured to produce an output stream with a high selectivity to carbon monoxide relative to dihydrogen such that the amount of dihydrogen that is not recovered is minimized.

FIG. 14 includes a block diagram 1400 with elements that are similar to those and of block diagram 900. FIG. 14 also includes flow chart 1410 of a set of methods that can be used in accordance with specific embodiments of the inventions disclosed herein. Block diagram 1400 differs from FIG. 13 in that the dihydrogen separated out by dihydrogen separator 1404 is supplied at the anode of carbon monoxide electrolyzer 1405 to be used as the oxidation substrate of the reactor. In these embodiments dihydrogen is oxidized at the anode instead of an alternative oxidation substrate such as water. Flow chart 1410 accordingly includes a step 1411 of separating a volume of dihydrogen. The dihydrogen can be, as illustrated, the volume of dihydrogen generated by the RWGS reactor along with the volume of carbon monoxide. Although the dihydrogen is shown as being separated out just prior to the carbon monoxide electrolyzer, it can be separated out at any point on the production line. Flow chart 1410 additionally includes a step 1412 of providing the volume of dihydrogen to an anode of the electrolyzer to be used as an oxidation substrate.

Figure 16:
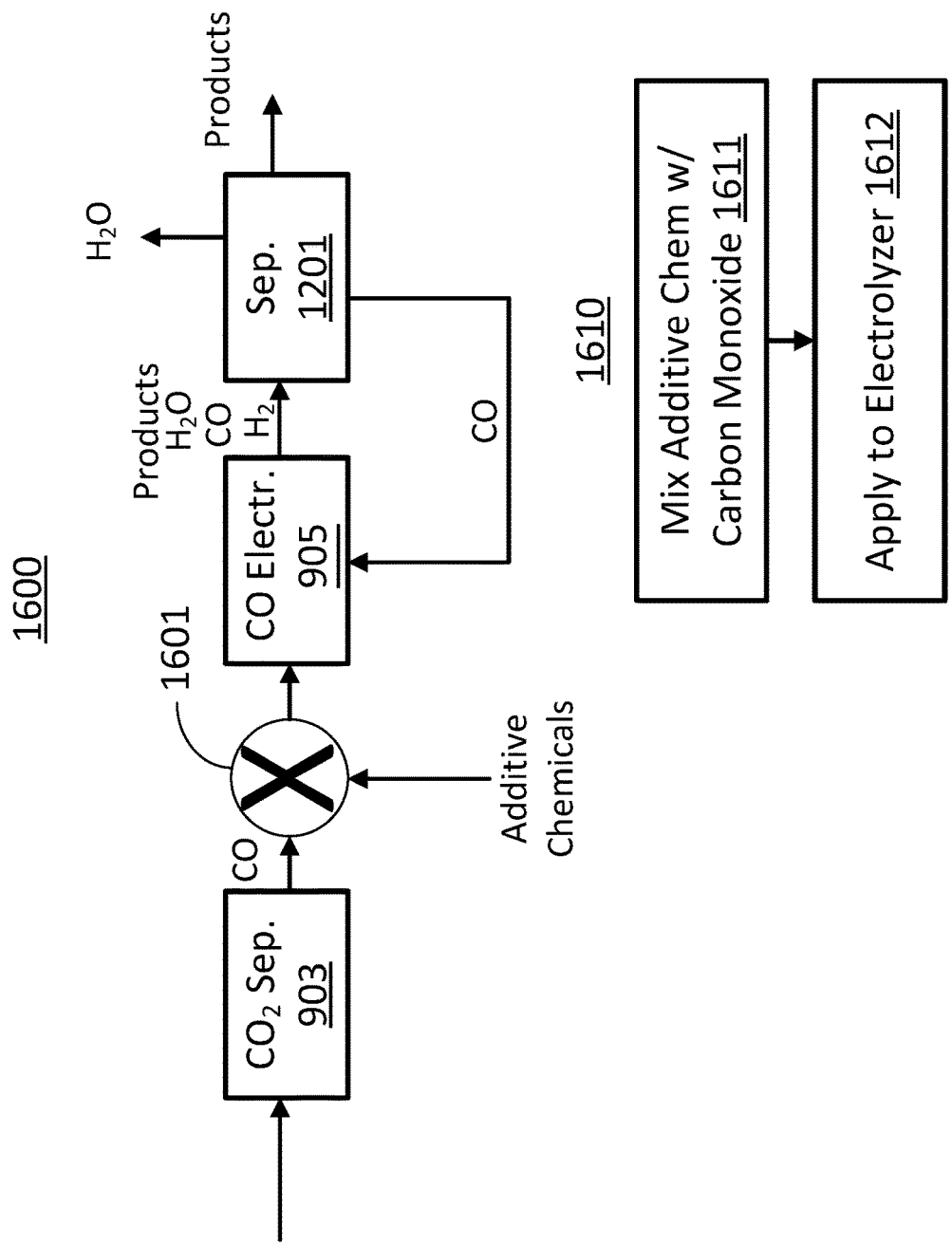
FIG. 16 illustrates a block diagram of an electrolyzer receiving carbon monoxide mixed with one or more additive chemicals in accordance with specific embodiments of the inventions disclosed herein.

In specific embodiments of the invention, the carbon monoxide that is provided to the carbon monoxide electrolyzer in a tandem reactor can be combined with additive chemicals. FIG. 16 includes block diagram 1600 with similar components to FIGS. 9 and 12 but with the addition of a mixer 1601 which can be used in a step 1611 from flow chart 1610 to mix additive chemicals with the carbon monoxide from the output of an RWGS reactor. After the additive chemicals have been mixed with the carbon monoxide, the resulting product can be applied to a carbon monoxide electrolyzer. This can be done in a step 1612 which includes applying the volume of additive chemicals and the carbon monoxide to a cathode area of a carbon monoxide electrolyzer. In specific embodiments, the volume of at least one additive chemical includes water and the water is from a RWGS reactor and there is no need for mixer 1601 because the carbon monoxide is already combined with water vapor. In alternative embodiments, the volume of additive chemicals can include chemicals that are externally applied to the system and introduced for the first time at mixer 1601. The additive chemicals can be one of imines, amines, nitrogen oxides and ammonia. The volume of additive chemicals can be a volume of amino acids.

In specific embodiments, the same electrolyzer, or portions of the same tandem reactor can be used with alternative functional units to produce different chemicals at different times. For example, the electrolyzer could be used as part of a system which filters out carbon monoxide from a syngas evolution process to produce high purity dihydrogen. Later, after the dihydrogen has been produced, the same electrolyzer could be used with a RWGS reactor to valorize carbon dioxide where the previously purified dihydrogen is used as a feedstock for the RWGS reactor. Alternatively, a different electrolyzer could be used for each task, with the same carbon dioxide source being routed between tandem reactors comprising the two different electrolyzers at different times.

Specific embodiments of the invention can include a means for supplying a volume of carbon dioxide to a reverse water gas shift reactor. The means can include fluid connections comprising any one of: valves, seals, pumps, conduits, pressure regulators, and associated electronic or mechanical controllers that can release a controlled volume of a carbon dioxide fluid into a reverse water gas shift reactor. For example, the means can be the components that control the provisioning of carbon dioxide into RWGS reactor 901 described above.

Specific embodiments of the invention can include a means for generating using the volume of carbon dioxide and the RWGS reactor, a volume of carbon monoxide in a RWGS reaction. These means can include actuators and associated control hardware, firmware, or software, that can admit a desired mix of dihydrogen and carbon dioxide into the RWGS reactor, heating the RWGS reactor to a desired temperature, pressurizing the RWGS reactor to a desired pressure, and removing the produced carbon monoxide and water from the reactor. The means can include one or more catalysts for a RWGS reactor as described above. The means can include actuators and associated control hardware, firmware, or software that are capable of admitting carbon dioxide or dihydrogen that has been fed back from a tandem carbon dioxide valorization reactor to the RWGS reactor 901.

Specific embodiments of the invention can include a means for supplying the volume of carbon monoxide to a cathode area of an electrolyzer. The means can include fluid connections comprising any one of: valves, seals, pumps, conduits, pressure regulators, and associated electronic or mechanical controllers that can admit a controlled volume of a carbon monoxide fluid into a cathode area of an electrolyzer. The means can include a separator in the form of a fluid trap to remove liquids from entering the electrolyzer. For example, the means can be the components that control the provisioning of carbon monoxide into carbon monoxide electrolyzer 905 described above.

Specific embodiments of the invention can include a means for generating, using the electrolyzer and a reduction of the volume of carbon monoxide and an oxidation of an oxidation substrate, a volume of generated chemicals. The means can include fluid connections comprising any one of: valves, seals, pumps, conduits, pressure regulators, and associated electronic or mechanical controllers that can admit a controlled volume of reduction substrate, oxidation substrate, and any electrolyte or additive chemical, into the cathode area and anode area of the electrolyzer. The means can include similar fluid connections and components to remove a controlled volume of reduction product, oxidation substrate, and electrolyte, and produced chemicals, from the cathode area and anode area of the electrolyzer. The means can also include one or more catalysts in the anode area and/or the cathode area and can also include a separating layer or separating area between the anode area and the cathode area. As described above, a separating area can also include a fluid input and a fluid output.

While the specification has been described in detail with respect to specific embodiments of the invention, it will be appreciated that those skilled in the art, upon attaining an understanding of the foregoing, may readily conceive of alterations to, variations of, and equivalents to these embodiments. The disclosure of volumes of chemicals in this disclosure is not meant to refer to a physically isolated volume as it is possible for a volume of dihydrogen to exist with a volume of carbon dioxide in a single physical volume in the form of a volume of syngas. Although examples in the disclosure were generally applied to industrial chemical processes, the same approaches are applicable to chemical processing of any scale and scope. Furthermore, while the examples in this disclosure were generally applied to the delivery of carbon monoxide to an electrolyzer, approaches disclosed herein are more broadly applicable to the delivery of any member of the oxocarbon family to an electrolyzer for the purposes of generating useful chemicals therefrom. These and other modifications and variations to the present invention may be practiced by those skilled in the art, without departing from the scope of the present invention, which is more particularly set forth in the appended claims.

What is claimed is:

1. A method comprising:
supplying a volume of carbon dioxide to a reverse water gas shift reactor;
generating, using the volume of carbon dioxide and the reverse water gas shift reactor, a volume of carbon monoxide in a reverse water gas shift reaction;
separating the volume of carbon monoxide and a second volume of carbon dioxide from an output volume of the reverse water gas shift reactor using a separator;
supplying the volume of carbon monoxide, after the volume of carbon monoxide and the volume of carbon dioxide have been separated, to a cathode area of an electrolyzer;
generating, using the electrolyzer and a reduction of the volume of carbon monoxide and an oxidation of an oxidation substrate, a volume of generated chemicals; and
providing a volume of dihydrogen from the cathode area of the electrolyzer to the reverse water gas shift reactor as a feedstock, wherein the volume of dihydrogen is controlled based on at least one of: (i) a decrease in the volume of carbon monoxide provisioned to the electrolyzer by the reverse water gas shift reactor; and (ii) an increase in a current density enforced at the electrolyzer;

wherein the volume of generated chemicals is at least one of: a volume of hydrocarbons, a volume of organic acids, a volume of alcohol, a volume of olefins and a volume of N-rich organic compounds.

2. The method of claim 1, further comprising:

separating the volume of carbon monoxide and a volume of dihydrogen from an output volume of the reverse water gas shift reactor using at least one separator unit; and providing the volume of dihydrogen from the at least one separator unit to the reverse water gas shift reactor as a feedstock.

3. The method of claim 1, wherein the electrolyzer uses an alkaline electrolyte.

4. The method of claim 1, wherein:

the reverse water gas shift reactor uses a set of heterogenous catalysts;

the reverse water gas shift reactor has a selectivity to carbon monoxide of over 90%; and the selectivity is defined as a ratio between an amount of carbon monoxide evolved over a sum of an amount of carbon monoxide evolved and an amount of methane evolved.

5. The method of claim 1, wherein:

the reverse water gas shift reactor is operated between 200 and 600° C.

6. The method of claim 1, wherein:

the reverse water gas shift reactor is operated between 600 and 1000° C.

7. The method of claim 1, wherein:

the reverse water gas shift reactor is a plasma-based reverse water gas shift reactor.

8. The method of claim 1, wherein:

the electrolyzer includes an ion exchange membrane between the cathode area and an anode area of the electrolyzer; and the cathode area includes a copper-based catalyst.

9. The method of claim 1, further comprising:

supplying a volume of dihydrogen to an anode of the electrolyzer to be used as the oxidation substrate;

wherein the volume of dihydrogen is from the reverse water gas shift reactor along with the volume of carbon monoxide.

10. The method of claim 1, further comprising:

mixing the volume of carbon monoxide with a volume of at least one additive chemical;

wherein the volume of carbon monoxide has been mixed with the volume of at least one additive chemical when the volume of carbon monoxide is supplied to the electrolyzer.

11. The method of claim 10, wherein:

the volume of at least one additive chemical includes water; and at least part of the water is from the reverse water gas shift reactor.

12. The method of claim 10, wherein:

the volume of additive chemical is one of an imine, an amine, a nitrogen oxide and ammonia; and the volume of generated chemicals is a volume of amino acids.

* * * * *